(12) United States Patent
Yamauchi et al.

(10) Patent No.: US 12,320,019 B2
(45) Date of Patent: Jun. 3, 2025

(54) ELECTROCHEMICAL REDUCTION METHOD, CATALYST, AND METHOD FOR PRODUCING CATALYST

(71) Applicant: KYUSHU UNIVERSITY, NATIONAL UNIVERSITY CORPORATION, Fukuoka (JP)

(72) Inventors: Miho Yamauchi, Fukuoka (JP); Akihiko Anzai, Fukuoka (JP)

(73) Assignee: KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 0 days.

(21) Appl. No.: 18/547,960

(22) PCT Filed: Mar. 2, 2022

(86) PCT No.: PCT/JP2022/008712
§ 371 (c)(1),
(2) Date: Aug. 25, 2023

(87) PCT Pub. No.: WO2022/186232
PCT Pub. Date: Sep. 9, 2022

(65) Prior Publication Data
US 2024/0133059 A1    Apr. 25, 2024
US 2024/0229258 A9    Jul. 11, 2024

Related U.S. Application Data

(60) Provisional application No. 63/155,309, filed on Mar. 2, 2021.

(51) Int. Cl.
*B01J 21/06*     (2006.01)
*B01J 23/72*     (2006.01)
(Continued)

(52) U.S. Cl.
CPC .......... *C25B 11/042* (2021.01); *B01J 21/063* (2013.01); *B01J 23/72* (2013.01); *C25B 3/03* (2021.01); *C25B 3/26* (2021.01)

(58) Field of Classification Search
CPC ................................ B01J 21/063; B01J 23/72
(Continued)

(56) References Cited

U.S. PATENT DOCUMENTS 9,873,115 B2 *   1/2018   Nagpal ................... B01J 35/39
10,449,530 B2 * 10/2019   Nagpal ................... B01J 27/04
(Continued)

FOREIGN PATENT DOCUMENTS

| CN | 102274729 | 12/2011 |
|----|-----------|---------|
| CN | 104549368 | 4/2015  |

(Continued)

OTHER PUBLICATIONS

PCT International Search Report (with English translation) and Written Opinion for corresponding PCT Application No. PCT/JP2022/008712, mailed May 10, 2022, 13 pages.
(Continued)

*Primary Examiner* — Cam N. Nguyen
(74) *Attorney, Agent, or Firm* — Dority & Manning, P.A.

(57) ABSTRACT

A catalyst includes an oxide containing titanium (Ti) and a copper (Cu). In an ultraviolet-visible absorption spectrum of the catalyst, a ratio $I_{400}/I_{600}$ of an intensity $I_{400}$ at a wavelength of 400 nm to an intensity $I_{600}$ at a wavelength of 600 nm may be 0.5 to 3.

4 Claims, 12 Drawing Sheets

(51) Int. Cl.
 *C25B 3/03* (2021.01)
 *C25B 3/26* (2021.01)
 *C25B 11/042* (2021.01)

(58) Field of Classification Search
 USPC .................................................. 502/345, 350
 See application file for complete search history.

(56) References Cited

U.S. PATENT DOCUMENTS

2013/0256124 A1   10/2013   Rahman et al.
2021/0016256 A1*   1/2021   Liu ......................... B01J 23/44

FOREIGN PATENT DOCUMENTS

CN   110508282   11/2019
JP   H07188961   7/1995

OTHER PUBLICATIONS

Cheng et al., "Achieving solar-to-hydrogen evolution promotion using TiO2 nanoparticles and an unanchored Cu co-catalyst", Materials Research Bulletin, vol. 129, Sep. 2020, 6 pages.

Ibrahim et al., "Direct Z-scheme of Cu2O/TiO2 enhanced self-cleaning, antibacterial activity, and UV protection of cotton fiber under sunlight", Applied Surface Science, vol. 479, Jun. 15, 2019, pp. 953-962.

Wang et al., "Single-Atomic Cu with Multiple Oxygen Vacancies on Ceria for Electrocatalytic CO2 Reduction to CH4", ACS Catalysis, vol. 8, 2018, pp. 7113-7119.

Yuan et al., "CuO Nanoparticles Supported on TiO2 with High Efficiency for CO2 Electrochemical Reduction to Ethanol", Catalysts, vol. 8, 2018, 11 pages.

\* cited by examiner

ELECTROCHEMICAL REDUCTION METHOD, CATALYST, AND METHOD FOR PRODUCING CATALYST

CROSS REFERENCE TO RELATED APPLICATIONS

This application is the U.S. National Stage entry of International Application No. PCT/JP2022/008712, filed on Mar. 2, 2022, which, in turn, claims priority to U.S. Provisional Patent Application No. 63/155,309, filed on Mar. 2, 2021, both of which are hereby incorporated herein by reference in their entireties for all purposes.

TECHNICAL FIELD

The present invention relates to an electrochemical reduction method, a catalyst and a method for producing a catalyst.

Priority is claimed on U.S. Provisional Application No. 63/155,309, filed Mar. 2, 2021, the content of which is incorporated herein by reference.

BACKGROUND ART

Attention has been paid to the electrochemical reduction reaction of $CO_2$ (hereinafter, referred to as $ECO_2R$ in some cases), by which a fuel or a chemical raw material is generated from $CO_2$ using renewable power, not only as a low-carbon material synthesis process but also as a new method for storing intermittent renewable energy such as sunlight or wind power.

For example, Non Patent Literature 1 discloses an electrochemical reduction method in which $CO_2$ is reduced to $CH_4$ with a $CeO_2$ catalyst to which Cu has been added.

CITATION LIST

Patent Literature

Non Patent Literature 1

Yifei Wang, Zheng Chen, Peng Han, Yonghua Du, Zhengxiang Gu, Xin Xu, and Gengfeng Zheng, Single-Atomic Cu with Multiple Oxygen Vacancies on Ceria for Electrocatalytic $CO_2$ Reduction to $CH_4$, ACS Catalysis 2018, 8, 7113-7119.

SUMMARY OF INVENTION cl Technical Problem

However, in the method of Non Patent Literature 1, the selectivity for $CH_4$ production and the production rate (current density) of $CH_4$ were not sufficient, Currently, there is a demand for additional improvement in the selectivity for $CH_4$ production and the current density as compared with those in the method of Non Patent Literature 1.

The present Invention has been made in consideration of the above-described circumstances, and an objective of the present invention is to provide an electrochemical reduction method in which the selectivity for $CH_4$ production is improved in an electrochemical reduction reaction of $CO_2$, a catalyst, and a method for producing a catalyst.

Solution to Problem (1) An electrochemical reduction method according to one aspect of the present invention, in which $CO_2$ is electrochemically reduced in a state where a solution having a pH of 5 to 15 and the $CO_2$ are in contact with a catalyst containing an oxide containing Ti.

(2) The electrochemical reduction method according to (1), in which the $CO_2$ is electrochemically reduced, whereby methane may be produced.

(3) The electrochemical reduction method according to (1) or (2), in which a band gap of at least a part of the oxide containing Ti may be 3 eV or less.

(4) The electrochemical reduction method according to any one of (1) to (3), in which a content of oxide containing Ti in the catalyst may be 10 wt % or more.

(5) The electrochemical reduction method according to any one of (1) to (4), in which the catalyst may contain Cu.

(6) The electrochemical reduction method according to (5), in which, in an X-ray photoelectron spectroscopy (XPS) spectrum of the catalyst measured by XPS, there may be a peak between 931 eV and 933 eV, and a half-width value of the peak that is present between 931 eV and 933 eV may be 1.4 eV to 1.9 eV.

(7) The electrochemical reduction method according to (6), in which a content of Cu in the catalyst may be 0.001 wt % to 90 wt %.

(8) The electrochemical reduction method according to any one of (1) to (7), in which the oxide containing Ti may be $TiO_2$.

(9) The electrochemical reduction method according to any one of (1) to (8), in which, in an ultraviolet-visible absorption spectrum of the catalyst, a ratio $I_{400}/I_{600}$ of an intensity $I_{400}$ at a wavelength of 400 nm to an intensity $I_{600}$ at a wavelength of 600 mm may be 0.5 to 3.

(10) The electrochemical reduction method according to any one of (1) to (9), in which, in an X-ray photoelectron spectroscopy (XPS) spectrum of the catalyst measured by XPS, there may be a peak between 528 eV and 532 eV, and a half-width value of the peak that is present between 528 eV and 532 eV may be 1.2 eV to 1.55 eV.

(11) The electrochemical reduction method according to (1) to (10), in which, in an X-ray photoelectron spectroscopy (XPS) spectrum of the catalyst measured by XPS, there may be a peak between 457 eV and 460 eV, and a half-width value of the peak that is present between 457 eV and 460 eV may be 1.1 eV to 1.5 eV.

(12) A catalyst according to one aspect of the present invention contains an oxide containing Ti and Cu.

(13) The catalyst according to (12), in which a content of the oxide containing Ti may be 10 wt % or more.

(14) The catalyst according to (12) or (13), in which a band gap of at least a part of the oxide containing Ti may be 3 eV or less.

(15) The catalyst according to any one of (12) to (14), in which a content of Cu may be 0.001 wt % to 90 wt %.

(16) The catalyst according to any one of (12) to (15), in which the oxide containing Ti may be $TiO_2$.

(17) The catalyst according to any one of (12) to (16), in which, in an ultraviolet-visible absorption spectrum of the catalyst, a ratio $I_{400}/I_{600}$ of an intensity $I_{400}$ at a wavelength of 400 nm to an intensity $I_{600}$ at a wavelength of 600 nm may be 0.5 to 3.

(18) The catalyst according to any one of (12) to (17), in which, in an X-ray photoelectron spectroscopy (XPS) spectrum measured by XPS, there may be a peak between 528 eV and 532 eV, and a half-width value of the peak that is present between may be 1.2 eV to 1.55 eV.

(19) The catalyst according to any one of (12) to (18), in which, in an X-ray photoelectron spectroscopy (XPS) spectrum measured by XPS, there may be a peak between 457 eV and 460 eV, and a half-width value of the peak that is present between 457 eV and 460 eV may be 1.1 eV to 1.5 eV.

(20) The catalyst according to any one of (12) to (19), in which, in an X-ray photoelectron spectroscopy (XPS) spectrum measured by XPS, there may be a peak between 931 eV and 933 eV, and a half-width value of the peak that is present between 931 eV and 933 eV may be 1.4 eV to 1.9 eV.

(21) A method for producing a catalyst according to one aspect of the present Invention, in which raw materials are mixed, put into an airtight container and heated until a surface temperature of the airtight container reaches a heating temperature, the heating temperature is then maintained for 10 minutes or longer to prepare a precursor, the prepared precursor is calcined at a calcination temperature for one minute or longer to produce a catalyst, and the raw materials include a titanium raw material and a copper raw material.

(22) The method for producing a catalyst according to (21), in which the titanium raw material may be titanium (IV) tetrabutoxide.

(23) The method for producing a catalyst according to (21) or (22), in which the copper raw material may be copper (II) acetate.

(24) The method for producing a catalyst according to any one of (21) to (23), in which the heating temperature may be 60° C. to 280° C.

(25) The method for producing a catalyst according to any one of (21) to (24), in which the calcination temperature may be 100° C. to 800° C.

(26) The method for producing a catalyst according to any one of (21) to (25), in which a weight ratio (Ti:Cu) between titanium that is contained in the titanium raw material and Co that is contained in the copper raw material in the airtight container may be 1:99 to 99.99:0.01.

(27) The method for producing a catalyst according to any one of (21) to (26), in which an atmosphere at the time of calcining the precursor may be an air.

(28) The method for producing a catalyst according to any one of (21) to (27), in which a $H_2$ concentration the time of calcining the precursor may be 0.5 vol % or higher.

(29) The method for producing a catalyst according to (28), in which the $H_2$ concentration at the time of calcining the precursor may be 100 vol %.

Advantageous Effects of Invention

According to the above-described aspects of the present invention, it is possible to provide an electrochemical reduction method in which the selectivity for $CH_4$ production is improved in an electrochemical reduction reaction of $CO_2$, a catalyst, and a method for producing a catalyst.

DESCRIPTION OF EMBODIMENTS

<Electrochemical Reduction Device>

Hereinafter, an electrochemical reduction device 100 that is used in an electrochemical reduction method according to an embodiment will be described with reference to a drawing. In drawings to be used in the following description, there is a case where a characteristic part is illustrated in an enlarged manner for convenience in order to facilitate the understanding of the characteristics, and the dimensional proportion and the like of each configuration element are different from actual ones in some cases. Materials, dimensions, and the like to be exemplified in the following description are simply examples, and the present invention is not limited thereto and can be carried out after being appropriately modified to an extent that the effect of the present invention is exhibited.

Figure 1:
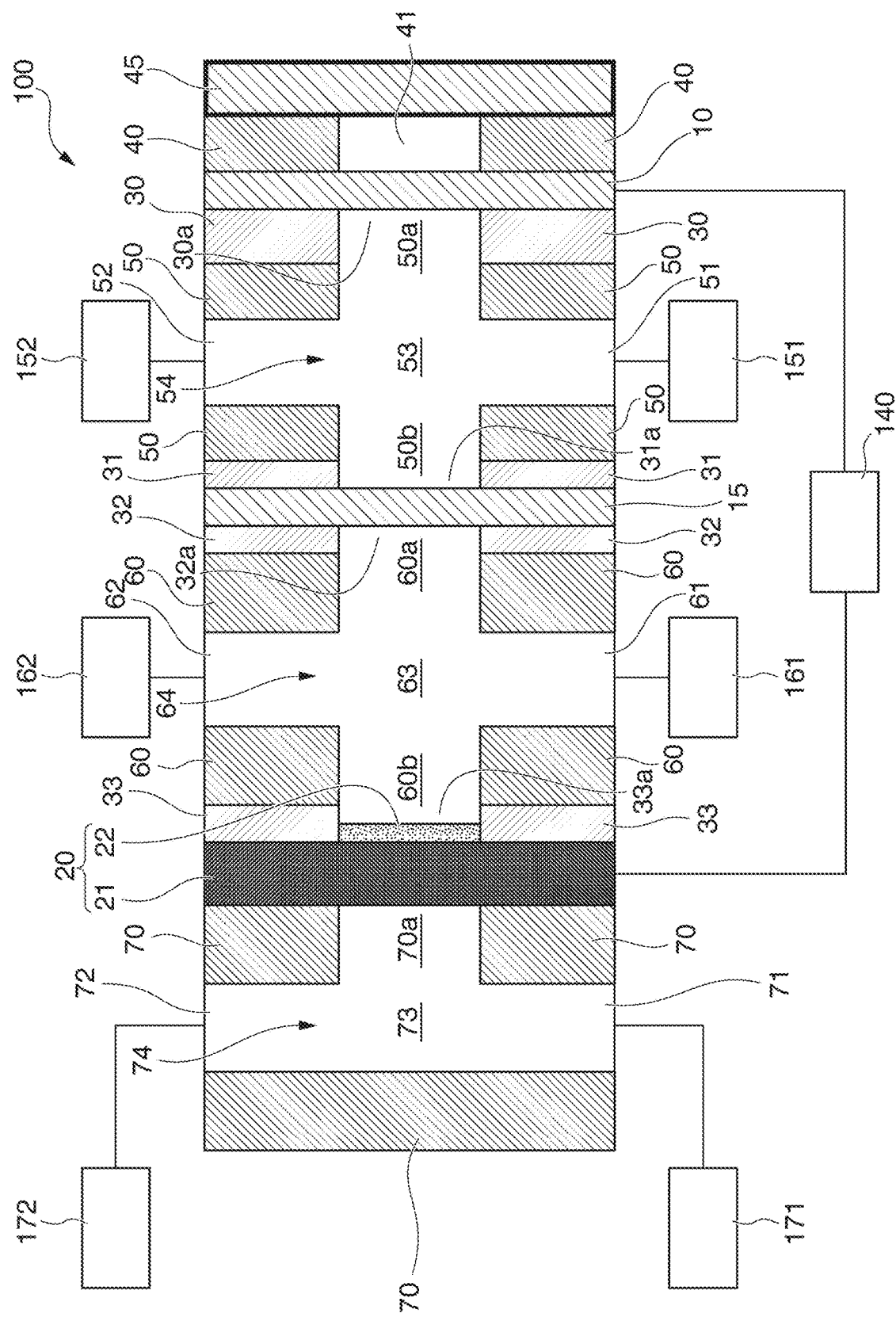
FIG. 1 is a schematic view of an electrochemical reduction device according to an embodiment.

FIG. 1 is a schematic view of the electrochemical reduction device 100 according to the present embodiment. The electrochemical reduction device 100 includes an anode 10, a separator 15, a cathode 20 and a power supply 140. The power supply 140 is electrically connected to the anode 10 and the cathode 20. The electrochemical reduction device 100 of the present embodiment further includes a first channel plate 30, a second channel plate 31, a third channel plate 32, a fourth channel plate 33, a first channel structure 50, a second channel structure 60, and a third channel structure 70. In addition, the electrochemical reduction device 100 of the present embodiment further includes a first solution delivery portion 151, a wastewater collection portion 152, a second solution delivery portion 161, a liquid product collection portion 162, a gas delivery portion 171, and a gas product collection portion 172. Hereinafter, each portion will be described.

(Anode)

The anode 10 is disposed between the first channel plate 30 and a gas discharge member 40. The anode 10 oxidizes a first electrolytic solution, which be described below, that has flowed into an anode chamber 53 from a first inlet 51 to generate oxygen, a hydrogen ion of the like. Among products generated by the oxidation of the first electrolytic solution, a substance that has been dissolved in the first electrolytic solution is discharged through a first outlet 52. In addition, a gas-phase product, for example, $O_2$, is discharged from the anode 10 through an opening part 41 of the gas discharge member 40.

The anode 10 is, for example, a porous material. The material of the anode 10 is, for example, a metal such as nickel, titanium, or iron or an alloy containing these metals. A specific example of the anode 10 is, for example, a nickel form.

The anode 10 may also include a catalyst that promotes the oxidation of the first electrolyte solution (oxidation catalyst). Examples of the oxidation catalyst include platinum, iridium, cobalt, iron, and the like.

(Gas Discharge Member)

In the electrochemical reduction device 100, the gas discharge member 40 is disposed between the anode 10 and a lid member 45. A separate channel plate or the like may be disposed between the anode 10 and the gas discharge member 40. The gas discharge member 40 may include an opening part 41 for discharging the gas-phase product generated by an oxidation reaction on the anode 10. The gas discharge member 40 may not include the opening part 41. A gas product (oxygen) generated by the oxidation reaction occurring on the anode 10 is discharged with the electrolytic solution from the opening part 41 or the first outlet 52.

(Lid Member)

In the electrochemical reduction device 100, the lid member 45 is disposed in contact with the gas discharge member 40.

(First Channel Plate)

The first channel plate 30 is disposed between the first channel structure 50 and the anode 10. In the first channel plate 30, an opening part 30a is provided so that the first electrolytic solution and the anode 10 can come into contact with each other. The material of the first channel plate 30 is not particularly limited as long as the first channel plate is chemically stable and has insulation properties. Examples of the material of the first channel plate 30 include polyether ether ketone (PEEK), fluororesins, glass, and the like.

(First Channel Structure 50)

In the electrochemical reduction device 100, the first channel structure 50 is disposed between the first channel plate 30 and the second channel plate 31 or between the first channel plate 30 and the separator 15. The first channel structure 50 includes the first inlet 51, the first outlet 52, the anode chamber 53, and a channel 54. The first channel structure 50 includes an opening part 50a for bringing the anode 10 and the first electrolytic solution into contact with each other. In addition, the first channel structure 50 includes an opening part 50b for bringing the separator 15 and the first electrolytic solution into contact with each other.

The first electrolytic solution is sent to the first inlet 51 from the first solution delivery portion 151. The first electrolytic solution that has entered the first inlet 51 enters the channel 54 and is sent to the anode chamber 53. In the anode chamber 53, an oxidation reaction on the anode 10 progresses, and the first electrolytic solution after the reaction is discharged from the first outlet 52 to the wastewater collection portion 152. The first solution delivery portion 151 is composed of, for example, a tank and a pump that store the first electrolytic solution, a flow rate control portion that controls the flow rate, and the like.

(Second Channel Plate)

The second channel plate 31 is disposed between the separator 15 and the first channel structure 50. The material of the second channel plate 31 is not particularly limited as long as the second channel plate is chemically stable and has insulation properties. Examples of the material of the second channel plate 31 include polyether ether ketone (PEEK), fluororesins, glass, and the like. The second channel plate 31 includes an opening part 31a for bringing the separator 15 and the first electrolytic solution into contact with each other. The electrochemical reduction device 100 functions even when the second channel plate 31 is not attached thereto, but it is desirable to install the second channel plate in order to simply prevent liquid leakage.

(Separator)

The separator 15 is disposed between the anode 10 and the cathode 20. In the present embodiment, the separator is disposed between the second channel plate 31 and the third channel plate 32. The separator 15 separates the anode 10 and the cathode 20 and makes it possible for some ions to be migrated between the anode 10 and the cathode 20. The separator 15 is not particularly limited as long as the separator separates the anode 10 and the cathode 20 and makes it possible for some ions to be migrated between the anode 10 and the cathode 20. Examples of the separator 15 include an ion exchange membrane. Examples of the ion exchange membrane include NAFION (registered trademark) membrane, which is a copolymer of a fluororesin based on sulfonated tetrafluoroethylene. Sustainion (registered trademark), which is a copolymer of styrene functionalized with 1-methyl imidazole and vinyl benzyl chloride. X37-50 Grade RT Membrane, and the like.

(Third Channel Plate)

The third channel plate 32 is disposed between the separator 15 and the second channel structure 60. The material of the third channel plate 32 is not particularly limited as long as the third channel plate is chemically stable and has insulation properties. Examples of the material of the third channel plate 32 include polyether ether ketone (PEEK), fluororesins, glass, and the like. The third channel plate 32 includes an opening part 32a for bringing the separator 15 and the first electrolytic solution into contact with each other. The electrochemical reduction device 100 functions even when the third channel plate 32 is not attached thereto, but it is desirable to install the third channel plate in order to simply prevent liquid leakage.

(Second Channel Structure)

The second channel structure 60 is disposed between the third channel plate 32 and the fourth channel plate 33 or between the separator 15 and the fourth channel plate 33. The second channel structure 60 includes a second inlet 61, a second outlet 62, a cathode chamber 63, and a channel 64.

In the channel 64, a second electrolytic solution, which will be described below, flows. The second channel structure 60 includes an opening part 60a for bringing the separator 15 and the second electrolytic solution into contact with each other. In addition, the second channel structure 60 includes an opening part 60b for bringing the cathode 20 and the second electrolytic solution into contact with each other.

The second electrolytic solution is sent to the second inlet 61 from the second solution delivery portion 161. The second electrolytic solution that has entered the second inlet 61 enters the channel 64 and is sent to the cathode chamber 63. In the cathode chamber 63, a reduction reaction on the cathode 20 progresses, and the second electrolytic solution containing a product generated by the reduction reaction on the cathode 20 is discharged from the second outlet 62. The discharged second electrolytic solution is sent to the liquid product collection portion 162. The product generated by the reduction reaction on the cathode 20 is collected in the liquid product collection portion 162. The second solution delivery portion 161 is composed of, for example, a tank and a pump that store the second electrolytic solution, a flow rate control portion that controls the flow rate, and the like.

(Fourth Channel Plate 33)

The fourth channel plate 33 is disposed between the cathode 20 and the second channel structure 60. The material of the fourth channel plate 33 is not particularly limited as long as the fourth channel plate is chemically stable and has insulation properties. Examples of the material of the fourth channel plate 33 include polyether ether ketone (PEEK), fluororesins, glass, and the like. The fourth channel plate 33 includes an opening part 33a for bringing the cathode 20 and the second electrolytic solution into contact with each other.

(Cathode)

The cathode 20 is disposed between the third channel structure 70 and the fourth channel plate 33. The cathode 20 includes a substrate 21 and a catalyst layer 22.

The substrate 21 has a function of transmitting a $CO_2$-containing gas, which will be described below, sent from the third channel structure 70 and is conductive. The substrate 21 is preferably porous. Examples of the substrate 21 include carbon paper, carbon cloth, and the like.

The catalyst layer 22 is provided on the substrate 21 and comes into contact with the second electrolytic solution. In catalyst layer 22, a reduction reaction of $CO_2$ is carried out from an ion supplied from the anode 10 and the $CO_2$-containing gas supplied from the third channel structure 70. The reduction reaction of $CO_2$ occurs near the boundary between the substrate 21 and the catalyst layer 22, a gas-phase gas product, such as methane, is discharged from a third outlet 72, and a product dissolved in the second electrolytic solution is discharged from the second outlet 62.

The catalyst layer 22 contains a catalyst. The content of the catalyst is preferably 1 wt % or more with respect to the total mass of the catalyst layer 22. The content of the catalyst is more preferably 10 wt % or more. The content of the catalyst is still more preferably 50 wt % or more. The content of the catalyst is preferably 99 wt % or less. The content of the catalyst is more preferably 80 wt % or less.

The catalyst in the catalyst layer 22 contains an oxide containing Ti. The oxide containing Ti contained in the catalyst makes it possible to improve the selectivity for methane production.

The oxide containing Ti in the catalyst is preferably $TiO_2$. $TiO_2$ is a compound exhibiting a chemical interaction with hydrogen. A reaction with a hydrogen gas makes $TiO_2$ absorb visible light, and thus it is possible to improve the conductivity of the catalyst by a heating treatment or the like under a hydrogen atmosphere.

The content of the oxide containing Ti is preferably 2 wt % or more with respect to the total mass of the catalyst. The content of the oxide containing Ti is more preferably 5 wt % or more. The content of the oxide containing Ti is still more preferably 10 wt % or more. The content of the oxide containing Ti is particularly preferably 90 wt % or more. Since Cu may not be contained, the upper limit of the content of the oxide containing Ti may be 100 wt %. The content of the oxide containing Ti is preferably 99.999 wt % or less.

The band gap of at least a part of the oxide containing Ti is preferably 3 eV or less. The band gap is more preferably 2.5 eV or less.

A method for measuring the band gap of at least a part of the oxide containing Ti will be described below. Here, an ultraviolet-visible light spectrum of the catalyst is measured, and the value of the band gap of the catalyst obtained from the obtained spectrum is regarded as the value of the band gap of at least a part of the oxide containing Ti. The band gap of the catalyst was calculated from a Tauc plot. The Tauc plot is based on an expression (2) in which the absorption coefficient α in a relational expression (1) proposed by Tauc, Davis, Mott, and other is substituted with the value F(R∞) of the vertical axis of a Kubelka-Munk-converted spectrum.

$$(h\nu\alpha)^{1/n} = A(h\nu - Eg) \quad (1)$$

$$(h\nu F(R\infty))^{1/n} = A(h\nu - Eg) \quad (2)$$

Here, h means the Planck constant, ν means the frequency, α means the absorption coefficient. Eg means the band gap, and A means the constant of proportionality. n is determined depending on the type of the transition of a sample, in the case of a direct allowed transition, n is set to ½, in the case of a direct forbidden transition, n is set to 3/2, in the case of an indirect allowed transition, n is set to 2, in the case of an indirect forbidden transition, n is set to 3. Anatase-type $TiO_2$ is an indirect transition-type semiconductor, and thus n is set to ½. When the values of (hν, $h\nu F(R\infty)^{1/2}$) are plotted on a graph along a horizontal axis hν and a vertical axis $h\nu F(R\infty)^{1/2}$ based on the Kubelka-Munk-converted spectrum, the absorption curve in the vicinity of the absorption end becomes linear, and, when a tangent is drawn so as to overlap this vicinity, and the intersection point with the horizontal axis is obtained, it is possible to obtain the band gap.

The catalyst preferably further contains Cu. Cu contained in the catalyst makes it possible to improve the selectivity for methane production. The content of Cu is preferably 0.001 wt % or more with respect to the total mass of the catalyst. The content of Cu is more preferably 1 wt % or more. The content of Cu is still more preferably 3 wt % or more. The content of Cu is preferably 90 wt % or less. The content of Cu is more preferably 20 wt % or less. The content of Cu is still more preferably 10 wt % or less. The content of Cu is particularly preferably 7 wt % or less.

In the ultraviolet-visible absorption spectrum of the catalyst, the ratio $I_{400}/I_{600}$ of the intensity $I_{400}$ at a wavelength of 400 nm to the intensity $I_{600}$ at a wavelength of 600 nm is preferably 0.5 to 3. When the ratio $I_{400}/I_{600}$ is 0.5 to 3, hydrogen is incorporated into lattices in the vicinity of the surface of $TiO_2$. Hydrogen present in the vicinity of the surface of $TiO_2$ makes it possible to efficiently supply hydrogen from the $TiO_2$ interface during a reduction reaction on Cu. This makes it possible to further improve the selectivity for methane production.

The ratio $I_{400}/I_{600}$ can be measured by the following method. An ultraviolet-visible absorption spectrum of the catalyst is measured. In a spectrum obtained by converting the obtained ultraviolet-visible absorption spectrum with the Kubelka-Munk function, the ratio $I_{400}/I_{600}$ is calculated from the intensity $I_{400}$ at a wavelength of 400 nm and the intensity $I_{600}$ at a wavelength of 600 nm.

It is preferable that, in a spectrum of the catalyst measured by X-ray photoelectron spectroscopy (XPS) (hereinafter, referred to as XPS spectrum in some cases), there is a peak (O1s peak belonging to O1s) between 528 eV and 532 eV and the half-width value of the peak present between 528 eV and 532 eV is present at 1.2 eV to 1.55 eV. The half-width value refers to the full width at half maximum. This makes it possible to prevent the deterioration of the catalyst due to the generation of an oxygen defect site. In addition, it is found that new hydrogen sites have been formed in $TiO_2$ lattices without generating any oxygen defect sites. Since the introduction of the hydrogen sites as described above generates a new state in the band, it is possible to improve the conductivity due to the narrowing of the band gap of the oxide containing Ti on the surface of the catalyst. In addition, the hydrogen sites also function as a hydrogen source in turning introduced $CO_2$ into hydrogen. Therefore, the rate of the reduction reaction can be improved.

It is desirable that, in the XPS spectrum of the catalyst, there is a peak ($Ti2p_{3/2}$ peak belonging to $Ti2p_{3/2}$) between 457 eV and 460 eV and the half-width value of the peak present between 457 eV and 460 eV becomes 1.1 eV to 1.5 eV even in a case where a hydrogen treatment is carried out. A peak having a peak top at 458.6 eV is a peak belonging to $Ti^{4+}$. The fact that there is a peak between 457 eV and 460 eV and the half-width value of the peak is 1.1 eV to 1.5 eV means ha there are not oxygen defects. Therefore, the conductivity is improved even without the generation of oxygen defect sites, which act as a cause of deterioration, whereby the rate of the reduction reaction can be improved.

It is preferable that, in the XPS spectrum of the catalyst, there is a peak between 931 eV and 933 eV and the half-width value of the peak present between 931 eV and 933 eV is 1.4 eV to 1.9 eV. The peak present between 931 eV and 933 eV is a peak derived from $Cu^0$. Here, the fact that there is a peak between 931 eV and 933 eV means that the peak top (a value where the intensity becomes the maximum value) is present between 931 eV and 933 eV. This is also true for other peaks. In a case where there is a peak between 931 eV and 933 eV and the half-width value of the peak is 1.4 eV to 1.9 eV, Cu on the surface of the catalyst is present as $Cu^0$. Therefore, the activity of the catalyst improves.

A method for measuring the XPS spectrum of the catalyst is carried out by the following method. A sample was measured using AlKα rays with a spot size set to 100 μm and the cumulative number of times (set to 10 times for O1s, 10 times for $Ti2p_{3/2}$, and 40 times for $Cu2p_{3/2}$). The half-width value was obtained by carrying out fitting with a mixed function of the Gaussian function and the Lorentzian function.

The catalyst layer 22 may further contain a binder. The binder is not particularly limited, but is preferably, for example, an electrolyte polymer. Examples of the electrolyte polymer include NAFION (registered trademark) membrane, which is a copolymer of a fluororesin based on sulfonated tetrafluoroethylene and the like. The content of the binder is, for example, 10 wt % to 50 wt %.

The catalyst layer 22 may further contain a conductive auxiliary agent such as acetylene black or carbon nanotube.

(Third Channel Structure)

The third channel structure 70 is disposed in contact with the substrate 21 of the cathode 20. The third channel structure 70 is in contact with a surface of the substrate 21 opposite to a surface on which the catalyst layer 22 is provided. The third channel structure 70 includes a third inlet 71, the third outlet 72, a gas chamber 73, and a gas channel 74. In the gas channel 74, the $CO_2$-containing gas, which will be described below, flows. The third channel structure 70 includes an opening part 70a for bringing the cathode 20 and the $CO_2$-containing gas into contact with each other.

The $CO_2$-containing gas is sent to the third inlet 71 from the gas delivery portion 171. The $CO_2$-containing gas that has entered the third inlet 71 enters the gas channel 74 and is sent to the gas chamber 73. In the gas chamber 73, a reduction reaction on the cathode 20 progresses, and the $CO_2$-containing gas containing a gas product generated by the reduction reaction on the cathode 20 (hereinafter, referred to as the generated gas in some cases) is sent from the third outlet 72 to the gas product collection portion 172.

Hitherto, the electrochemical reduction device 100 according to the present embodiment has been scribed in detail. According to the electrochemical reduction device 100 according to the present embodiment, it is possible to improve the selectivity for methane production in the reduction reaction of $CO_2$.

In the electrochemical reduction device 100 of the present embodiment, no reference electrode was provided, but a reference electrode may be provided. Examples of the reference electrode include a mercury-mercury oxide electrode (Hg/HgO) and the like.

In the electrochemical redaction device 100 of the present embodiment, the first channel plate 30, the second channel plate 31, the third channel plate 32, and the fourth channel plate 33 were used, but each channel plate may not be used.

In the gas discharge member 40, if it is possible to remove a gas-phase substance such as $O_2$ generated by an oxidation reaction on the anode 10 provided with the opening part 41, the opening part 41 may not be provided.

<Electrochemical Reduction Method>

Next, an electrochemical reduction method according to the present embodiment will be described. In the electrochemical reduction method according to the present embodiment, $CO_2$ is electrochemically reduced in a state where a solution having a pH of 5 to 15 and $CO_2$ have been brought into contact with a catalyst containing an oxide containing Ti. Hereinafter, a method for carrying out an electrochemical reduction method using the electrochemical reduction device 100 will be described, but the present invention is not limited to the method in which the electrochemical reduction device 100 is used.

The electrochemical reduction method according to the present embodiment includes a first electrolytic solution delivery step of sending the first electrolytic solation to the anode chamber 53, a second electrolytic solution delivery step of sending the second electrolytic solution to the cathode chamber 63, a $CO_2$ containing gas delivery step of sending the $CO_2$-containing gas to the gas chamber 73, and an electrochemical reduction step of electrochemically reducing $CO_2$. In the present embodiment, each step is carried out, for example, in parallel.

(First Electrolytic Solution Delivery Step)

In the first electrolyte solution delivery step, the first electrolytic solution is sent to the anode chamber 53 from the first solution delivery portion 151. In addition, a product arising from the oxidation reaction that has occurred on the anode 10 is sent to the wastewater collection portion 152.

The first electrolytic solution is an electrolytic solution containing at least water ($H_2O$). Examples of the first electrolytic solution include electrolytic solutions containing at least one selected from the group consisting of a hydroxide ion, a potassium ion, a hydrogen ion, a sodium ion, a lithium ion, a chloride ion, a sulfate ion, a carbonate ion, and a nitrate ion. Examples of an electrolyte include potassium hydroxide, sodium hydroxide, and the like.

The pH of the first electrolytic solution is 5 to 15. The pH of the first electrolytic solution is 6 or higher. When the pH of the first electrolytic solution is 5 to 15, it is possible to make the oxidation reaction on the anode 10 easy to progress.

The flow rate of the first electrolytic solution can be set as appropriate depending on the area of the anode 10 and the volume of the anode chamber 53.

(Second Electrolytic Solution Delivery Step)

In the second electrolytic solution delivery step, the second electrolytic solution is sent to the cathode chamber 63 from the second solution delivery portion 161. In addition, a product arising from the reduction reaction that has occurred in the cathode chamber 63 is sent to the liquid product collection portion 162.

The second electrolytic solution is an electrolytic solution containing at least water. Examples of the second electrolytic solution include electrolytic solutions containing at least one selected from the group consisting of a hydroxide ion, a potassium ion, a hydrogen ion, a sodium ion, a lithium ion, a chloride ion, a sulfate ion, a carbonate ion, and a nitrate ion. Examples of an electrolyte include potassium hydroxide, sodium hydroxide, and the like.

The pH of the second electrolytic solution is 5 to 15. The pH of the second electrolytic solution is 6 or higher. When the pH of the first electrolytic solution is 5 to 15, it is possible to make the oxidation reaction on the anode 10 easy to progress. The pH of the first electrolytic solution and the pH of the second electrolytic solution are preferably the same as each other.

The flow rate of the second electrolytic solution can be set as appropriate depending on the area of the cathode 20 and the volume of the cathode chamber 63. The flow rate of the second electrolytic solution is 0.5 ml min$^{-1}$ to 7 ml min$^{-1}$.

($CO_2$) Containing Gas Delivery Step)

In the $CO_2$-containing gas delivery step, the $CO_2$-containing gas is sent to the gas chamber 73 from the gas delivery portion 171. In addition, a gas-phase product (gas product) arising from the reduction reaction that has occurred in the cathode chamber 63 is sent to the gas product collection portion 172.

The $CO_2$ concentration in the $CO_2$-containing gas is preferably 10 vol % of higher with respect to the total volume of the $CO_2$-containing gas. The $CO_2$ concentration in the $CO_2$-containing gas is more preferably 50 vol % or higher. The $CO_2$ concentration in the $CO_2$-containing gas is still more preferably 90 vol % or higher. The upper limit of the $CO_2$ concentration is 100 vol %.

The flow rate of the $CO_2$-containing gas can be set as appropriate depending on the area of the cathode 20 and the volume of the cathode chamber 63. The flow rate of the $CO_2$-containing gas is, for example, 1 to 15 sccm.

(Electrochemical Reduction Step)

In the electrochemical reduction step, $CO_2$ is electrochemically reduced. Specifically, a voltage is applied between the anode 10 and the cathode 20 from the power supply 140 to supply a current. When the current flows between the anode 10 and the cathode 20, an oxidation reaction progresses in the vicinity of the anode 10, and a reduction reaction progresses in the vicinity of the cathode 20. The following reaction will be described using methane ($CH_4$) as an example, but $C_2H_4CO$, or the like may also be generated in the electrochemical reduction step. The reaction on the anode 10 and the reaction on the cathode 20 will be separately described.

When the current is supplied between the anode 10 and the cathode 20 from the power supply 140, an oxidation reaction of water occurs between the first electrolytic solution in contact with the anode 10 and the current. Specifically, in a case where the pH is 7 or lower, as shown in the following expression (3), water that is contained in the first electrolytic solution is oxidized to generate oxygen and hydrogen ions.

$$2H_2O \rightarrow 4H^+ + O_2 + 4e^- \quad (3)$$

In a case where the pH is higher than 7, as shown in the following expression (4), OH$^-$ that is contained in the first electrolytic solution is oxidized to generate oxygen and water.

$$4OH^+ \rightarrow O_2 + 2H_2O + 4e^- \quad (4)$$

In a case where the pH is 7 or lower, H$^+$ generated on the anode 10 migrates through the first electrolytic solution, the separator 15, and the second electrolytic solution and arrives at the catalyst layer 22 of the cathode 20. Due to the current (e$^-$) that is supplied from the power supply 140 and H$^+$ that has arrived at the catalyst layer 22 of the cathode 20, an electrochemical reduction reaction of $CO_2$ progresses. Specifically, as shown in the following expression (5), $CO_2$ in the $CO_2$-containing gas supplied to the cathode 20 from the gas chamber 73 is reduced to become $CH_4$. That is, $CO_2$ is electrochemically reduced, thereby producing $CH_4$.

$$CO_2 + 8H^+ + 8e^- \rightarrow CH_4 + 2H_2O \quad (5)$$

In a case where the pH is higher than 7, as shown in the following expression (6), $CO_2$ that is contained in the first electrolytic solution is reduced and reacted with $H_2O$ to produce $CH_4$ and OH$^-$. The produced OH$^-$ is conveyed to the at ode through the separator:

$$CO_2 + 6H_2O + 8e^- \rightarrow CH_4 + 8OH^- \quad (6)$$

The above-described reaction on the cathode 20 progresses on the catalyst in the catalyst layer 22. That is, $CO_2$ is electrochemically reduced in a state where a solution having a pH of 5 to 15 and $CO_2$ have been brought into contact with the catalyst in the catalyst layer 22.

The voltage that is applied between the anode 10 and the cathode 20 is, for example, 0 V to −4.0 V. The voltage is more preferably −1.0 V to −2.5 V. When the voltage is −1.0 V to −2.5 V, it is possible to make the electrochemical reduction reaction of $CO_2$ progress in a state where the energy conversion efficiency is higher.

Hitherto, the electrochemical reduction method according to the present embodiment has been described. According to the electrochemical reduction method according to the present embodiment, in the electrochemical reduction method of $CO_2$, it is possible to improve the selectivity for $CH_4$ production.

<Method for Producing Catalyst>

Next, a method for producing a catalyst according to the present embodiment will be described. In the method for producing a catalyst according to the present embodiment, raw materials are mixed, put into an airtight container and heated until a surface temperature of the airtight container reaches a heating temperature, the heating temperature is then maintained for 10 minutes or longer to prepare a precursor, the prepared precursor is calcined at a calcination temperature for one minute or longer to produce a catalyst. In the present embodiment, a catalyst is produced using a solvothermal method. Hereinafter, the method for producing a catalyst according to the present embodiment will be described.

(Raw Materials)

In the method for producing a catalyst according to the present embodiment, the raw materials include a titanium raw material containing titanium (Ti) and a copper raw material containing copper (Cu).

Examples of the titanium raw material include titanium (IV) methoxide, titanium (IV) tetrabutoxide, titanium (IV) isopropoxide, titanium diboride, and the like. As the titanium raw material, titanium (IV) tetrabutoxide is preferable.

The copper raw material is, for example, copper (II) acetate, copper (II) stearate, or copper (II) chloride. As the copper raw material, copper (ID) acetate is preferable.

The weight ratio (Ti:Cu) between titanium (Ti) that is contained in the titanium raw material and copper (Cu) that is contained in the cupper raw material is preferably 1:99 to 99.99:0.01. The weight ratio (Ti:Cu) is more preferably 10:90 to 99:1. The weight ratio (Ti:Cu) is still more preferably 50:50 to 93:7. When the weight ratio (Ti:Cu) is 99:1 to 90:10, it is possible to effectively isolate Cu in an oxide containing Ti. However, when the weight ratio is outside the above-described range, $CH_4$ can be produced if it is possible to isolate Cu. In a case where Cu atoms are not isolated, the proportion of a C2 compound being generated due to C—C coupling in two CO's increases. Isolation of Cu makes it possible to improve the selectivity for methane production.

The heating temperature in the airtight container is preferably 60° C. to 280° C. When the heating temperature is within the temperature range of 60° C. to 280° C., it is possible to produce the precursor of the catalyst with a high yield. The heating temperature is more preferably 180° C. to 220° C.

The retention time of the airtight container after the heating temperature is reached is preferably 10 minutes or longer. The retention time is more preferably one hour or longer. When the retention time is set to 10 minutes or longer, it is possible to increase the yield of the precursor of the catalyst.

The calcination temperature of the precursor is preferably 100° C. to 800° C. When the calcination temperature is within the range of 100° C. to 800° C., it is possible to produce a catalyst from the precursor. The calcination temperature is more preferably 300° C. to 500° C.

The atmosphere at the time of calcining the precursor is not particularly limited. The atmosphere at the time of calcining the precursor may be an air or a hydrogen atmosphere. In the method for producing a catalyst according to the present embodiment, the precursor is preferably calcined under a hydrogen atmosphere.

The $H_2$ concentration at the time of calcining the precursor is preferably 0.5 vol % or higher. The $H_2$ concentration at the time of calcination is more preferably 5 vol % or higher. The $H_2$ concentration is more preferably 99.9 vol % or higher. The upper limit of the $H_2$ concentration is 100 vol %. When the $H_2$ concentration is 1 vol % or higher, it is possible to put at least a part of Cu in the catalyst into a state of $Cu^0$. In addition, it is possible to incorporate hydrogen into lattices in the vicinity of the surface of $TiO_2$ and to improve the selectivity for methane production.

<Method for Producing Cathode>

The cathode 20 is obtained by forming the catalyst layer 22 containing the catalyst on the conductive porous substrate 21. A method for forming the catalyst layer 22 is not particularly limited. For example, the catalyst layer 22 may be formed on the substrate 21 by applying and drying a dispersion liquid, in which the catalyst has been dispersed, to and on the substrate 21.

A method for applying the dispersion liquid is not particularly limited. For example, the dispersion liquid (catalyst ink) may be applied using a spray. A binder or the like may be contained in the dispersion liquid.

Hitherto, the electrochemical reduction method, the catalyst, and the method for producing a catalyst according to the present embodiment have been described. The technical scope of the present invention is not limited to the above-described embodiment, and a variety of modifications can be added thereto within the scope of the gist of the present invention. Additionally, it is possible to appropriately replace a configurational element in the embodiment with a well-known configurational element within the scope of the gist of the present invention.

EXAMPLES

Next, examples of the present invention will be described. Conditions in the examples are examples of conditions adopted to confirm the feasibility and effect of the present invention, and the present invention is not limited to the examples of conditions. The present invention is capable of adopting a variety of conditions as long as the objective of the present invention is achieved without departing from the gist of the present invention.

(Synthesis of Catalysts)

Titanium (IV) tetrabutoxide was quickly added to a mixture of 30 mL of N-dimethylformamide (99.5%), 0.207 mL of 2-propanol, and copper (II) acetate, anhydrous. A PTFE container containing the mixture was moved into a stainless steel autoclave, sealed, put into an oven, and maintained at 200° C. for 20 hours. An obtained solid matter was centrifuged at 7500 rpm for 10 minutes. An obtained precursor was separated and then washed with ethanol, acetone, and hexane several times. After that, the precursor was dried in a vacuum at room temperature. Finally, the precursor was heated at 450° C. for 30 minutes in the air or a hydrogen gas stream (60 ml min$^{-1}$) (heating treatment) to obtain a catalyst (xCu—$TiO_2$-y). x in xCu—$TiO_2$-y indicates the amount (x wt. %) of Cu doped into the catalyst. y in xCu—$TiO_2$-y indicates the atmosphere at the time of heating. Here, in a case where the precursor was heated under the atmosphere, y was "air," and, in a case where the or as heated in a $H_2$ atmosphere, y was "H." One milliliter of titanium (IV) tetrabutoxide was quickly added to a mixture of 30 mL of N,N-dimethylformamide (99.5%), 0.215 ml of 2-propanol, and (anhydrous) copper (II) acetate equivalent to an intended amount supported. In the preparation of 1Cu—$TiO_2$, 6.64 mg of (anhydrous) copper (II) acetate was used. In addition, $TiO_2$-y was obtained by performing synthesis under the same conditions as for xCu—$TiO_2$-y except that copper (II) acetate was not added in the same manner. y in $TiO_2$-y indicates the atmosphere at the time of heating. Here, in a case where the precursor was heated under the atmosphere, y as "air," and, in a case where the precursor was heated in a $H_2$ atmosphere, y was "H." 1Cu—$TiO_2$ was prepared so that the weight ratio (Ti:Cu) between titanium (Ti) in titanium (IV) tetrabutoxide and copper (Cu) that was contained in copper acetate was within a range of 100:0 to 90.5:9.5.

(Element Compositions of Catalysts)

The element compositions of the prepared catalysts were measured by energy dispersive X-ray spectroscopy (EDS) using JED-2300 (JEOL).

(XRD Patterns of Catalysts)

Powder X-ray diffraction (XRD) patterns of the catalysts were acquired with RIKEN Beamline BL44B2.

(Ultraviolet-Visible Absorption Spectra)

Ultraviolet-visible absorption spectra of the catalysts were measured using 670 (JASCO Corporation). Reflection intensities in the ultraviolet-visible absorption spectra were converted into intensities corresponding to the light absorption coefficient using a Kubelka-Munk function.

(XPS)

X-ray photoelectron spectroscopy (XPS) spectra of the catalysts were carried out using VersaProbeII (ULVAC-PHI) and AlKα rays. The binding energies of the XPS spectra were corrected with the C1s binding energy of a carbon atom, which was a ligand, in a sample set to 284.5 eV.

(STEM)

A scanning transmission electron microscope (STEM) of the catalyst was carried out at 200 kV using JEM-ARM200F (JEOL, Ltd.).

(Production of Electrode)

A gas diffusion electrode (GDE) for a cathode was produced by the following method. A carbon paper (Fuel Cell Store Sigracet 22 BB, micro-porous layer-attached) was used as a substrate. 200 µL of 2-propanol, 200 µL of water, 10 µL of a Nafion (registered trademark) solution (Sigma-Aldrich 527084), and 1 mg of a catalyst powder synthesized above were mixed together. A mixture was put into a 4 mL screw vial and ultraviolet-dispersed for 15 minutes, thereby producing a catalyst ink. The obtained catalyst ink was sprayed onto the carbon paper with an air brush, thereby producing a cathode.

(Electrochemical $CO_2$ Reduction Reaction)

An electrochemical $CO_2$ reduction reaction ($ECO_2R$) was carried out with a three-electrode system electrochemical reduction device obtained by adding a reference electrode (mercury-mercury oxide electrode (Hg/HgO)) to an electrochemical reduction device shown in FIG. 1. The cathode produced by the above-described method was used as a cathode, and a nickel form was used as an anode. The electrode area of the cathode in the electrochemical reduction device as set to 1 cm$^2$. A Nafion (registered trademark) 117 cation exchange membrane was used to partition the electrochemical reduction device into a cathode chamber and an anode chamber.

A 1 M KOH aqueous solution (pH: 13.8) was introduced into the cathode chamber at a rate of 7 mL min$^{-1}$ and the anode chamber at a rate of 1 mL min$^{-1}$, respectively, with two pumps. A pure $CO_2$ gas was continuously supplied to a gas chamber of the electrochemical reduction device 100 at a flow rate of 15 mL min$^{-1}$. The activity of $ECO_2R$ was evaluated by chronopotentiometry. The potential of the cathode was converted into the value of a reversible hydrogen electrode (RHE) using the following expression (7). All voltages mentioned herein are not iR-corrected.

$$E \text{ (vs. RHE)} = E \text{ (vs. Hg/HgO)} + 0.098 \text{ V} + 0.0591 \text{ V} \times pH \quad (7)$$

(Analysis of Product in Electrochemical $CO_2$ redaction reaction)

A gas product generated by the electrochemical $CO_2$ reduction reaction was analyzed using a micro OC (Inficon Micro GC Fusion (registered trademark)) in which a thermal conductivity detector (TCD) was combined to a Molsieve 5A column and Plot Q column.

A liquid product generated by electrochemical $CO_2$ reduction reaction was analyzed with a refractive index detector (RID-10A, Shimadzu Corporation)-attached high performance liquid chromatograph (HPLC, LC-20AD, Shimadzu).

The Faradaic efficiency (FE) of the product is defined by the following expression (8). Here, $n_i$ in expression (2) represents the molar number of a product i, and $z_i$ in the expression (8) represents the number of electrons necessary for the production of the product i. $z_i$ is two for CH, formic acid, and $H_2$, and $z_i$ is eight for $CH_4$. $z_i$ is 12 for $C_2H_4$, and $z_i$ is 14 for $C_2H_6$. F in the expression (8) is the Faraday constant (96,485 C mol$^{-1}$). Q in the expression (8) is the amount of charges that have flowed during $ECO_2R$.

[Number 1]

$$FE_i = \frac{n_i \times z_i \times F}{Q} \times 100 \quad (8)$$

In the case of the gas product, $n_i$ was calculated based on the following expression (9). Here, $x_i$ is the volume fraction of a gas product i, $P_0$ is the atmospheric pressure (1 atm), v is the flow rate (0.015 L min$^{-1}$) of $CO_2$, t is the reaction time, R is the gas constant (0.08205 L·atm·mol$^{-1}$K$^{-1}$), and T is 298 K.

[Number 2]

$$n_i, \text{gas} = \frac{P_0 \times x_i \times v \times t}{R \times T} \quad (9)$$

(Element Ratios of Catalysts)

Figure 2:
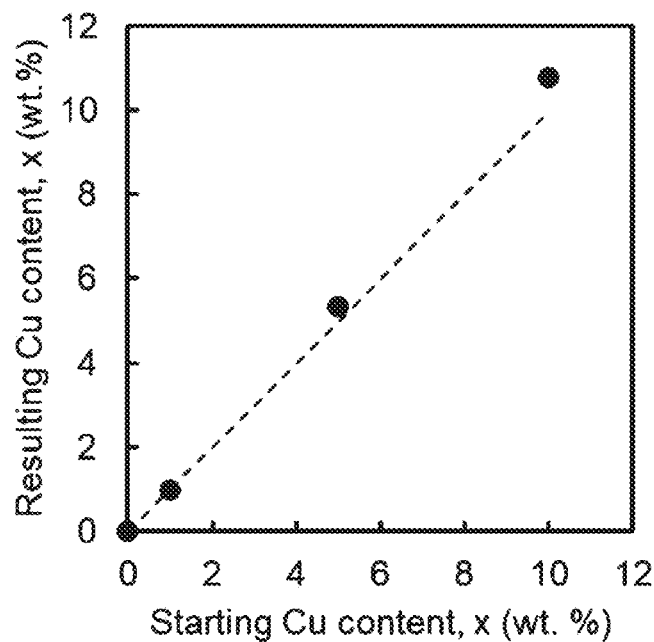
FIG. 2 is a view showing the relationship between the starting composition of a catalyst and the composition ratio of Cu measured by EDS.

FIG. 2 shows the relationship between the starting composition of Cu with respect to the obtained xCu—$TiO_2$ sample and the element composition determined by EDS measurement. The horizontal axis of FIG. 2 indicates the Cu content (wt %) upon the start of the synthesis, and the vertical axis of FIG. 2 indicates the Cu content (wt %) in the catalyst after the synthesis. As shown in FIG. 2, it was confirmed that the element composition determined by EDS measurement well matched the starting composition ratio and roughly the target amount of Cu was contained.

(Structures of Catalysts)

Figure 3:
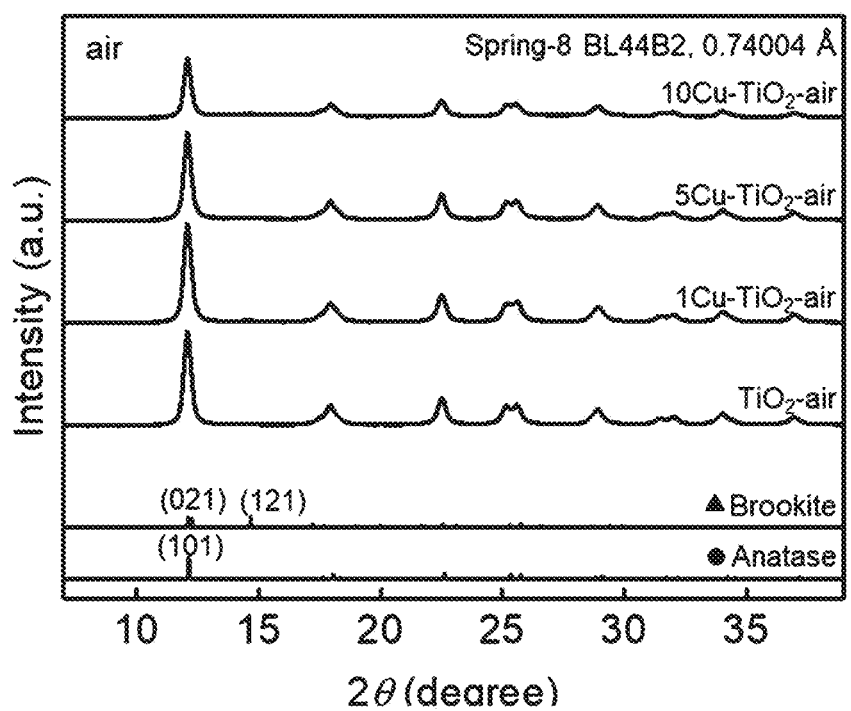
FIG. 3 is the XRD patterns of a catalyst obtained by a heating treatment under the atmosphere, anatase $TiO_2$ and brookite $TiO_2$.
Figure 4:
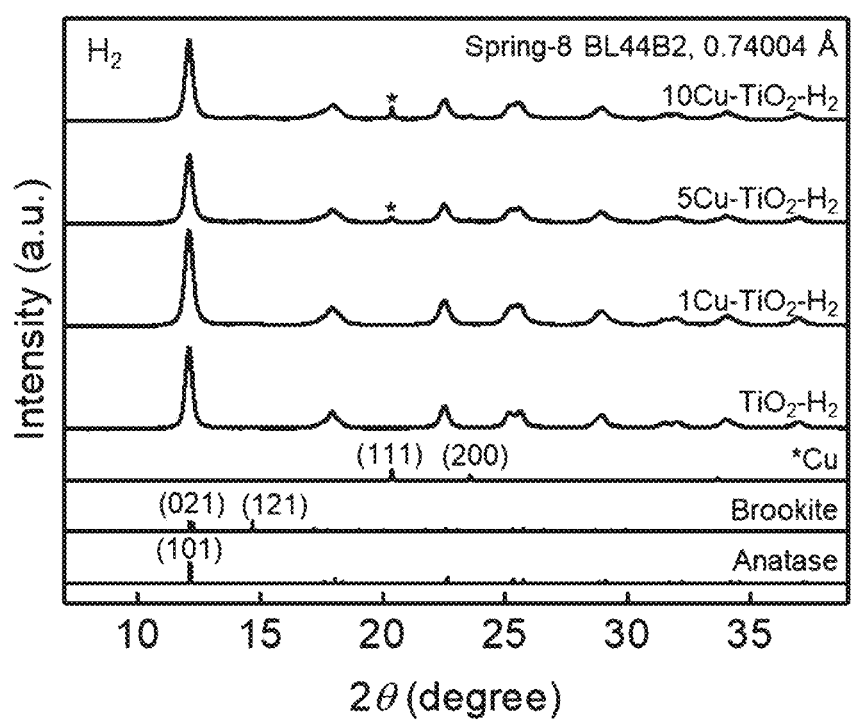
FIG. 4 is the XRD patterns of a catalyst obtained by a heating treatment under a hydrogen atmosphere, anatase $TiO_2$, brookite $TiO_2$ and Cu.

FIG. 3 shows the XRD patterns of the catalysts (xCu—$TiO_2$-air) obtained by the heating treatment under the atmosphere, anatase $TiO_2$ and brookite $TiO_2$. The horizontal axis of FIG. 3 is 20 (degree), and the vertical axis is the intensity (a.u.). FIG. 4 shows the XRD patterns of the catalysts (xCu—$TiO_2$air) obtained by the heating treatment under the hydrogen atmosphere, anatase $TiO_2$, brookite $TiO_2$ and Cu. The horizontal axis of FIG. 4 is 20 (degree), and the vertical axis is the intensity (a.u.).

As shown in FIG. 3 and FIG. 4, for the catalysts obtained by the heating treatment under the atmosphere or under the hydrogen atmosphere, diffraction lines from anatase $TiO_2$ and, slightly, brookite $TiO_2$ were observed. As shown in FIG. 4, for Cu—$TiO_2$ obtained by heating under the hydrogen atmosphere, diffraction from Cu was observed in the catalysts having a Cu content of 5 wt % or more. That is, it has been clarified that, in the catalysts containing 5 wt % or more of Cu, there are Cu nanoparticles.

The ionic radii of six-coordinate $Ti^{4+}$ ion (0.605 Å) and $Cu^{2+}$ (0.73 Å) are different from each other, the ionic radius of $Cu^{2+}$ is larger; however, no shifts of the diffraction peak position of anatase were observed in all of the catalysts. This fact implied that the majority of Cu introduced into the catalysts was not doped into the $TiO_2$ lattices, but was dispersed in the vicinity of the $TiO_2$ surface.

(XPS Spectra of Catalysts)

Figure 5:
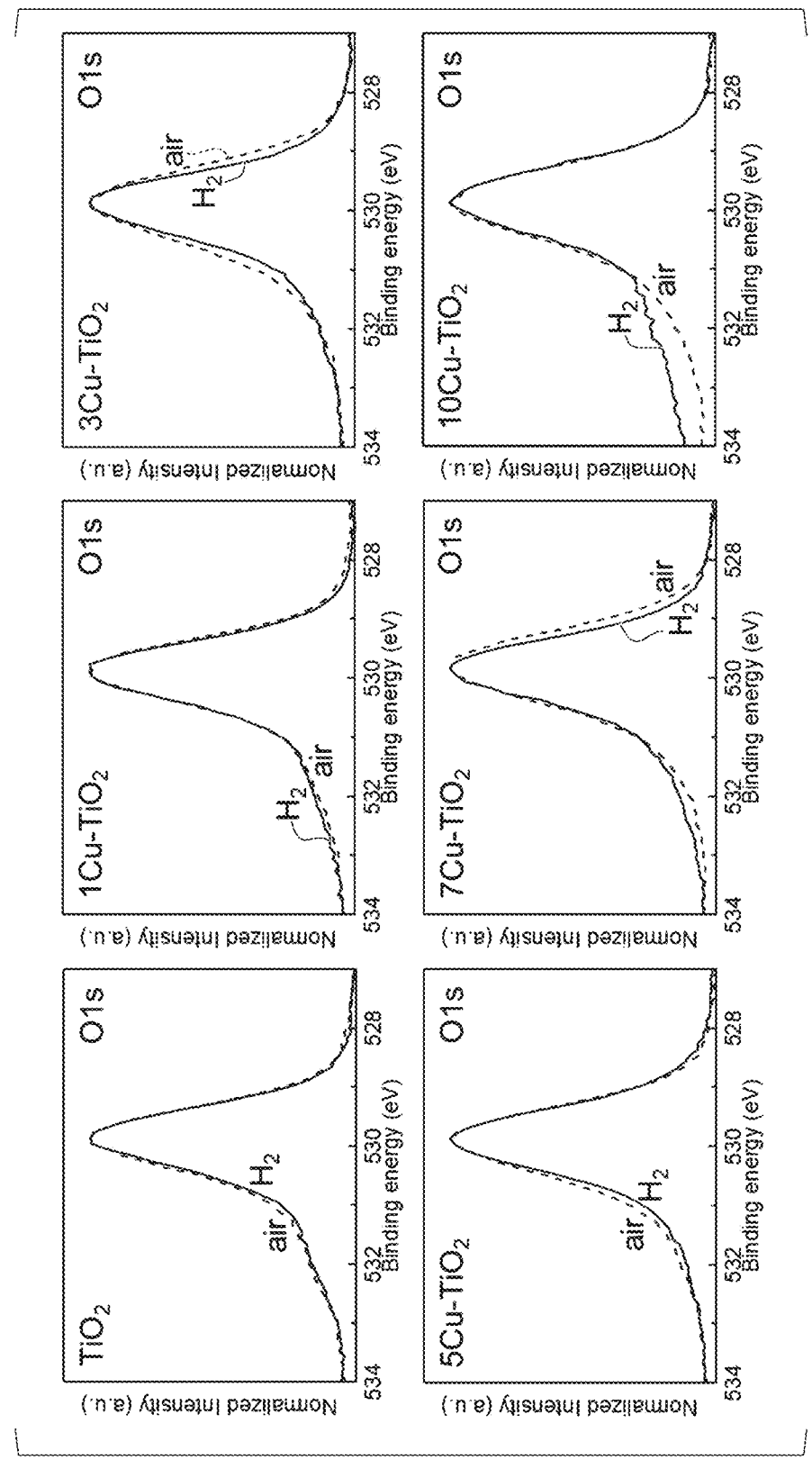
FIG. 5 is O1s XPS spectra of catalysts obtained by a heating treatment under the atmosphere or under a hydrogen atmosphere with a different Cu content.

FIG. 5 shows the XPS spectra of O1s of the catalysts obtained by the heating treatment under the atmosphere or under the hydrogen atmosphere with a different Cu content. As shown in FIG. 5, peaks were confirmed between 528 eV and 532 eV (O1s peaks). FIG. 5 are XPS spectra of O1s of $TiO_2$ with 0 wt % of Cu ($TiO_2$), $1Cu—TiO_2$ to which 1 wt % of Cu had been added, $3Cu—TiO_2$ to which 3 wt % of Cu had been added, $5Cu—TiO_2$ to which 5 wt % of Cu had been added, $7Cu—TiO_2$ to which 7 wt % of Cu had been added, and $10Cu—TiO_2$ to which 10 wt % of Cu had been added. The solid line in each XPS spectrum indicates the catalyst on which the heating treatment was carried out under the hydrogen atmosphere ($H_2$), and the dashed line in each XPS spectrum indicates the catalyst on which the heating treatment was carried out under the atmosphere (air). The horizontal axis in FIG. 5 indicates the binding energy (eV), and the vertical axis indicates the normalized intensity (a.u.). In addition, fitting was carried out on the obtained O1s peaks, and the full widths at half maximum (FWHM) (unit: eV) of the O1s peaks were obtained. The obtained results are shown in Table 1. As shown in FIG. 5 and Table 1, the XPS spectra of O1s were almost the same except those of $10Cu—TiO_2$-air and $10Cu—TiO_2H_2$. From this fact, it was found that O atoms in the vicinities of the surfaces of $xCu—TiO_2$-y's have the same binding environment regardless of the difference in the atmosphere of the heat treatment or the content of Cu. The difference in the spectrum of $10Cu—TiO_2$-air is considered to be attributed to the Cu (II) species. That is, it has been clarified that, on the surfaces of $Cu—TiO_2$-air and $Cu—TiO_2—H$, there are no oxygen defects.

TABLE 1

| Sample name | FWHM O1s (eV) |
|---|---|
| $TiO_2$-air | 1.3582 |
| $TiO_2$—H | 1.3067 |
| $1Cu—TiO_2$-air | 1.3369 |
| $1Cu—TiO_2$—H | 1.2993 |
| $3Cu—TiO_2$-air | 1.6038 |
| $3Cu—TiO_2$—H | 1.3547 |
| $5Cu—TiO_2$-air | 1.4444 |
| $5Cu—TiO_2$—H | 1.3367 |
| $7Cu—TiO_2$-air | 1.5053 |
| $7Cu—TiO_2$—H | 1.3511 |
| $10Cu—TiO_2$-air | 1.5504 |
| $10Cu—TiO_2$—H | 1.5158 |

Figure 6:
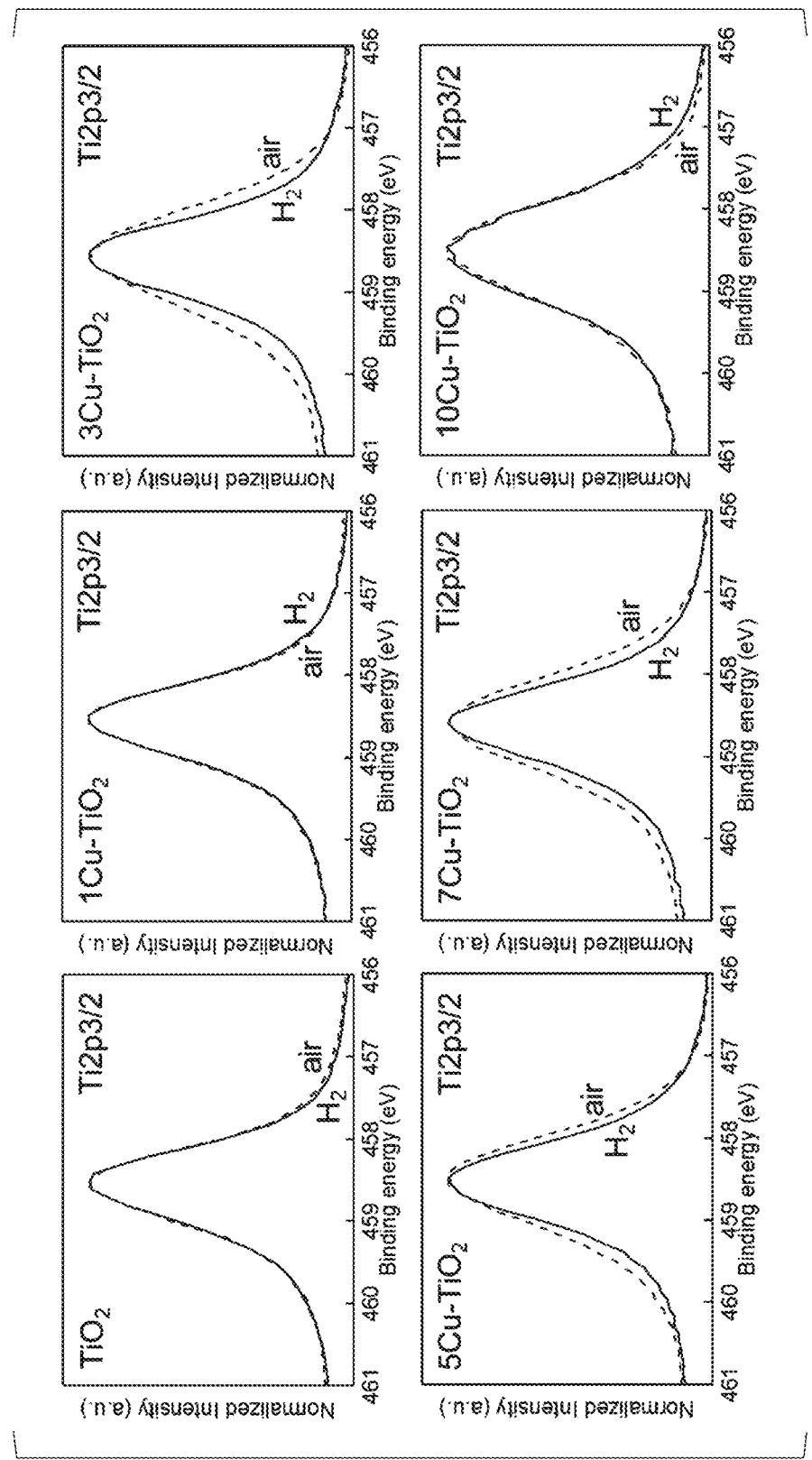
FIG. 6 is $Ti2p_{3/2}$ XPS spectra of catalysts obtained by a heating treatment under the atmosphere or under a hydrogen atmosphere with a different Cu content.

FIG. 6 shows the $Ti2p_{3/2}$ XPS spectra of the catalysts obtained by the heating treatment under the atmosphere or under the hydrogen atmosphere with a different Cu content. As shown in FIG. 6, peaks ($Ti2p_{3/2}$ peaks) were confirmed between 457 eV and 460 eV. FIG. 6 are $Ti2p_{3/2}$ XPS spectra of $TiO_2$ with 0 wt % of Cu ($TiO_2$), $1Cu—TiO_2$ to which 1 wt % of Cu had been added, $3Cu—TiO_2$ to which 3 wt % of Cu had been added, $5Cu—TiO_2$ to which 5 wt % of Cu had been added, $7Cu—TiO_2$ to which 7 wt % of Cu had been added, and $10Cu—TiO_2$ to which 10 wt % of Cu had been added. The solid line in each XPS spectrum indicates the catalyst on which the heating treatment was carried out under the hydrogen atmosphere ($H_2$), and the dashed line in each XPS spectrum indicates the catalyst on which the heating treatment was carried out under the atmosphere (air). The horizontal axis in FIG. 6 indicates the binding energy (eV), and the vertical axis indicates the normalized intensity (a.u.). In addition, fitting was carried out on the obtained $Ti2p_{3/2}$ peaks, and the full widths at half maximum (FWHM) (unit: eV) of the $Ti2p_{3/2}$ peaks were obtained. The obtained results are shown in Table 2.

TABLE 2

| Sample name | FWHM $Ti2p_{3/2}$ (eV) |
|---|---|
| $TiO_2$-air | 1.1294 |
| $TiO_2$—H | 1.1187 |
| $1Cu—TiO_2$-air | 1.1249 |
| $1Cu—TiO_2$—H | 1.1177 |
| $3Cu—TiO_2$-air | 1.4831 |
| $3Cu—TiO_2$—H | 1.1617 |
| $5Cu—TiO_2$-air | 1.3686 |
| $5Cu—TiO_2$—H | 1.1704 |
| $7Cu—TiO_2$-air | 1.4081 |
| $7Cu—TiO_2$—H | 1.1493 |
| $10Cu—TiO_2$-air | 1.4686 |
| $10Cu—TiO_2$—H | 1.4263 |

As shown in the $Ti2p_{3/2}$ XPS spectra of $xCu—TiO_2$-y's of FIG. 6, all of the catalysts on which the heating treatment was carried out under the atmosphere or under the hydrogen atmosphere imparted symmetrical peaks with respect to 458.6 eV, which belongs to $Ti^{4+}$. These show a typical spectrum shape of a $Ti^{4+}$—O coupling in $TiO_2$. Among the peaks, no clear peak shifts toward the low energy side were shown. Therefore, the fact that Ti in the vicinities of the surfaces of $xCu—TiO_2$-y's were $Ti^{4+}$ and no oxygen defects were introduced regardless of the difference in the atmosphere of the heating treatment or the content of Cu was proved. Additionally, as shown in Table 2, there was a tendency that the full widths at half maximum were small in catalysts on which the hydrogen treatment was carried out.

Figure 7:
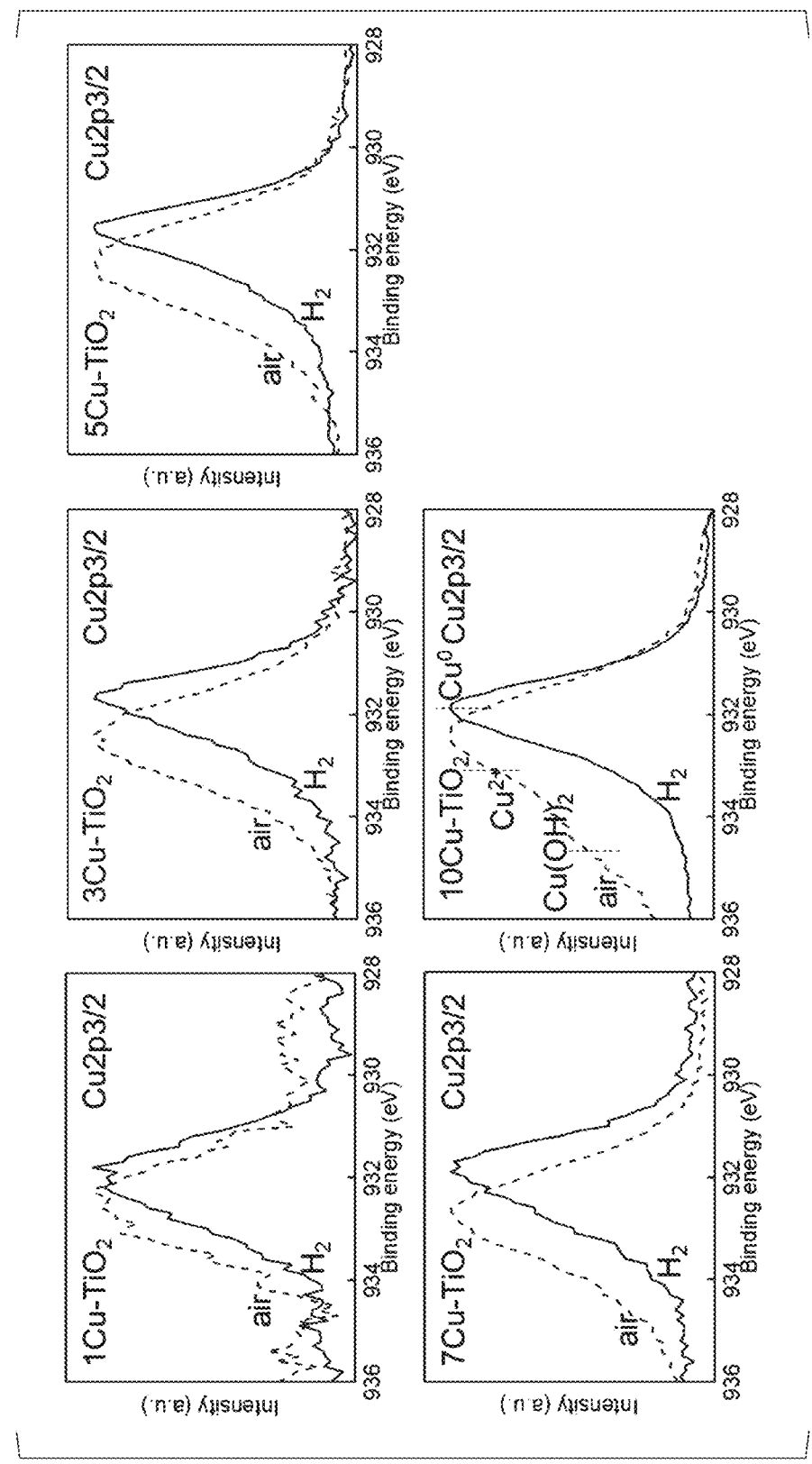
FIG. 7 is $Cu2p_{3/2}$ XPS spectra of catalysts obtained by a heating treatment under the atmosphere or under a hydrogen atmosphere with a different Cu content.

FIG. 7 shows the $Cu2p_{3/2}$ XPS spectra of the catalysts obtained by the heating treatment under the atmosphere or under the hydrogen atmosphere with a different Cu content. As shown in FIG. 7, peaks were confirmed between 931 eV and 933 eV ($Cu2p_{3/2}$ peaks). FIG. 7 are $Cu2p_{3/2}$ XPS spectra of $1Cu—TiO_2$ to which 1 wt % of Cu had been added, $3Cu—TiO_2$ to which 3 wt % of Cu had been added, $5Cu—TiO_2$ to which 5 wt % of Cu had been added, $7Cu—TiO_2$ to which 7 wt % of Cu had been added, and $10Cu—TiO_2$ to which 10 wt % of Cu had been added. The solid line in each XPS spectrum indicates the catalyst on which the heating treatment was carried out under the hydrogen atmosphere ($H_2$), and the dashed line in each XPS spectrum indicates the catalyst on which the heating treatment was carried out under the atmosphere (air). The horizontal axis in FIG. 7 indicates the binding energy (eV), and the vertical axis indicates the normalized intensity (a.u.). In addition, fitting was carried out on the obtained $Cu2p_{3/2}$ peaks, and the full widths at half maximum (FWHM) (unit: eV) of the obtained $Cu2p_{3/2}$ peaks were obtained. The obtained results are shown in Table 3.

TABLE 3

| Sample name | FWHM $Cu2p_{3/2}$ (eV) |
|---|---|
| $TiO_2$-air | — |
| $TiO_2$—H | — |

TABLE 3-continued

| Sample name | FWHM Cu2p$_{3/2}$ (eV) |
|---|---|
| 1Cu—TiO$_2$-air | 2.0225 |
| 1Cu—TiO$_2$—H | 2.0266 |
| 3Cu—TiO$_2$-air | 2.121 |
| 3Cu—TiO$_2$—H | 1.5422 |
| 5Cu—TiO$_2$-air | 2.0976 |
| 5Cu—TiO$_2$—H | 1.4865 |
| 7Cu—TiO$_2$-air | 2.2501 |
| 7Cu—TiO$_2$—H | 1.8646 |
| 10Cu—TiO$_2$-air | 2.8578 |
| 10Cu—TiO$_2$—H | 1.6201 |

In the spectrum of Cu—TiO$_2$-air in FIG. 7, a Cu2p$_{3/2}$ peak having a center at 933.6 eV and a shoulder peak on the high binding energy side were imparted. The peak at 933.6 eV belongs to Cu (I), and the shoulder peak on the high binding energy side belong to Cu (II). It was found that, in xCu—TiO$_2$-air's, Cu was mainly present as an oxide of Cu (I) and Cu (II) on the TiO$_2$ surfaces. As shown in Table 3, there was a tendency that the full widths at half maximum of Cu—TiO$_2$-air's were wider than the full widths at half maximum in a case where the hydrogen treatment was carried out. "-" in Table 3 indicates that it was not possible to confirm the peak of Cu2p$_{3/2}$.

In the spectra of xCu—TiO$_2$—H's in FIG. 7, Cu2p$_{3/2}$ peaks having a center at 932.6 eV were imparted. These peaks belong to Cu$^0$. That is, it was found that, in xCu—TiO$_2$—H's, Cu was mainly present as Cu$^0$ on the TiO$_2$ surfaces.

(Ultraviolet-Visible Absorption Spectra of Catalysts)

Figure 8:
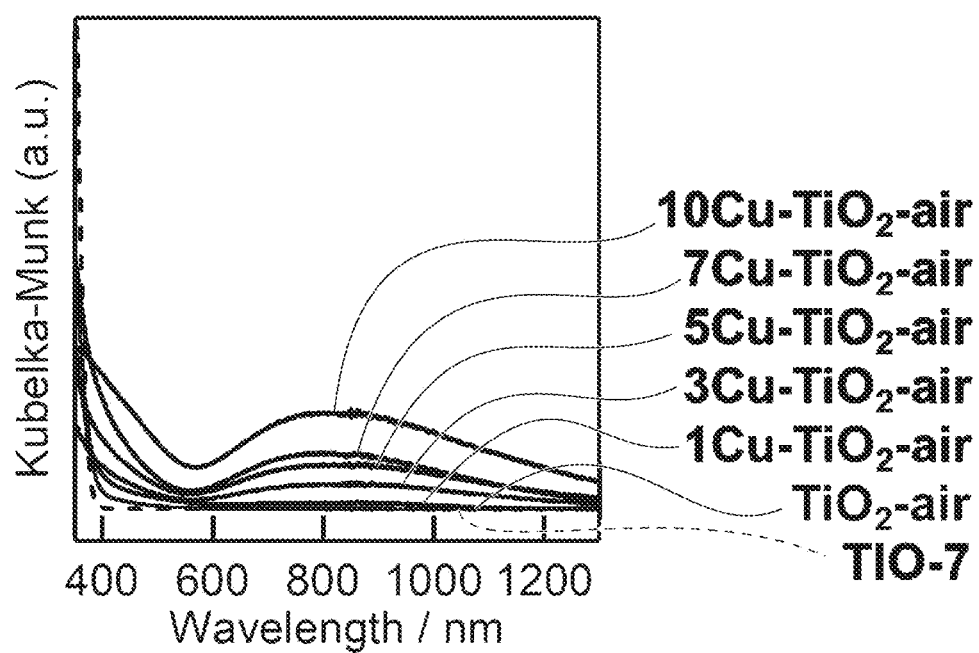
FIG. 8 is ultraviolet-visible (UV-Vis) spectra of catalysts obtained by a heating treatment under the atmosphere with a different Cu content.

FIG. 8 is the ultraviolet-visible absorption spectra of the catalysts obtained by the heating treatment under the atmosphere with a different Cu content. The horizontal axis of FIG. 8 is the wavelength (nm), and the vertical axis is the intensity (a.u.) that corresponds to the light absorption coefficient and is obtained by the Kubelka-Munk conversion of the reflectance R.

As shown in FIG. 8, TiO$_2$-air was a white powder and showed strong absorption in the ultraviolet range. The band gap of the catalyst was calculated from a Tauc plot. The Tauc plot is based on the expression (2) in which the absorption coefficient α in the expression (1) proposed by Tauc, Davis, Mott, and other is substituted with the value F(R∞) of the vertical axis of a Kubelka-Munk-converted spectrum.

Here, b is the Planck constant, v is the frequency, α is the absorption coefficient, Eg is the band gap, A is the constant of proportionality, and n is determined depending on the type of the transition of a sample. In the case of a direct allowed transition, n is set to ½, in the case of a direct forbidden transition, n is set to 3/2, in the case of an indirect allowed transition, n is set to 2, and, in the case of an indirect forbidden transition, n is set to 3. Anatase-type TiO$_2$ is an indirect transition-type semiconductor, and thus n is set to ½. When the values of (hv, hvF(R∞)$^{1/2}$) are plotted on a graph along a horizontal axis hv and a vertical axis hvF(R∞)$^{1/2}$ based on the Kubelka-Munk-converted spectrum, the absorption curve in the vicinity of the absorption end becomes linear, and, when a tangent is drawn so as to overlap this vicinity, and the intersection point with the horizontal axis is obtained, it is possible to obtain the band gap. The value of the band gap of each catalyst calculated from a Tauc plot is shown in Table 4. The values are smaller than the band gap (3.24 eV) of the reference catalyst JRC-TIO-7 (anatase-type titanium oxide) of the Catalysis Society of Japan.

TABLE 4

| Sample name | Band gap (eV) |
|---|---|
| TiO$_2$-air | 3.14 |
| TiO$_2$—H | 3.03 |
| 1Cu—TiO$_2$-air | 2.9 |
| 1Cu—TiO$_2$—H | 2.8 |
| 3Cu—TiO$_2$-air | 2.36 |
| 3Cu—TiO$_2$—H | 2.26 |
| 5Cu—TiO$_2$-air | 2.31 |
| 5Cu—TiO$_2$—H | 2.32 |
| 7Cu—TiO$_2$-air | 2.46 |
| 7Cu—TiO$_2$—H | 2.54 |
| 10Cu—TiO$_2$-air | — |
| 10Cu—TiO$_2$—H | — |
| JRC-TIO-7 | 3.24 |

In the catalysts xCu—TiO$_2$-air's to which Cu was added, not only did the absorption peaks slightly shift toward the visible light region as the Cu content increased, but absorption bands also appeared between 400 nm and 500 nm and between 550 nm and 1500 nm. The first absorption band at 400 nm to 500 nm belongs to the interfacial charge transfer from the O2p orbit, which forms the valence band of TiO$_2$, to a state of Cu (II) attached to TiO$_2$, and the absorption band at 550 nm to 1500 nm belongs to the d-d transition of Cu (II).

From this result, it was found that, similar to the results of XPS, Cu on xCu—TiO$_2$-air's is present as Cu (II).

Figure 9:
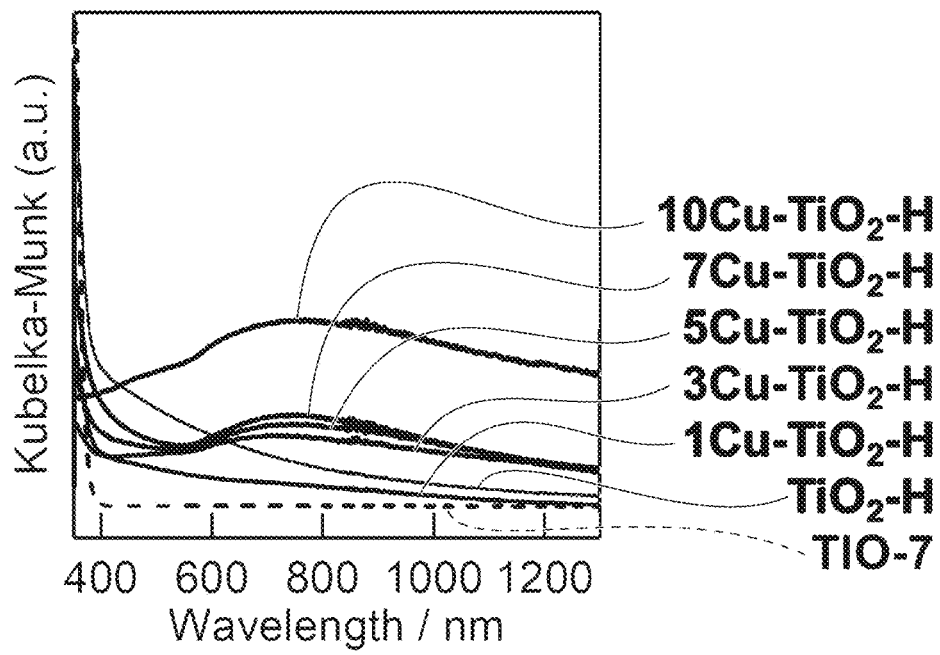
FIG. 9 is ultraviolet-visible absorption spectra of catalysts obtained by a heating treatment under a hydrogen atmosphere with a different Cu content.

FIG. 9 is the ultraviolet-visible absorption spectra of the catalysts obtained by the heating treatment under the hydrogen atmosphere with a different Cu content. The horizontal axis of FIG. 9 is the wavelength (nm), and the vertical axis is the intensity (a.u.) that corresponds to the light absorption coefficient and is obtained by the Kubelka-Munk conversion of the reflectance R. TiO$_2$—H and 1Cu—TiO$_2$—H obtained by the heating treatment under the hydrogen atmosphere were dark brown powders, and peculiar absorption, which was not observed from white TiO$_2$, appeared from 400 nm to the near-infrared region. The ratios $I_{400}/I_{600}$ of the intensity at 400 nm to the intensity at a wavelength of 600 nm obtained from FIG. 8 and FIG. 9 are shown in Table 5. As shown in Table 5, there is a tendency that the ratios $I_{400}/I_{600}$ of the catalysts on which the heating treatment was carried out under the hydrogen atmosphere are lower than the values in a case where the heating treatment was carried out under the atmosphere.

TABLE 5

| Sample name | Intensity radio ($I_{400}/I_{600}$) |
|---|---|
| TiO$_2$-air | 483 |
| TiO$_2$—H | 2.51 |
| 1Cu—TiO$_2$-air | 6.57 |
| 1Cu—TiO$_2$—H | 1.91 |
| 3Cu—TiO$_2$-air | 3.88 |
| 3Cu—TiO$_2$—H | 0.845 |
| 5Cu—TiO$_2$-air | 3.72 |
| 5Cu—TiO$_2$—H | 1.14 |
| 7Cu—TiO$_2$-air | 4.84 |
| 7Cu—TiO$_2$—H | 1.49 |
| 10Cu—TiO$_2$-air | 2.92 |
| 10Cu—TiO$_2$—H | 0.709 |
| JRC-TIO-7 | 6.81 |

Figure 10:
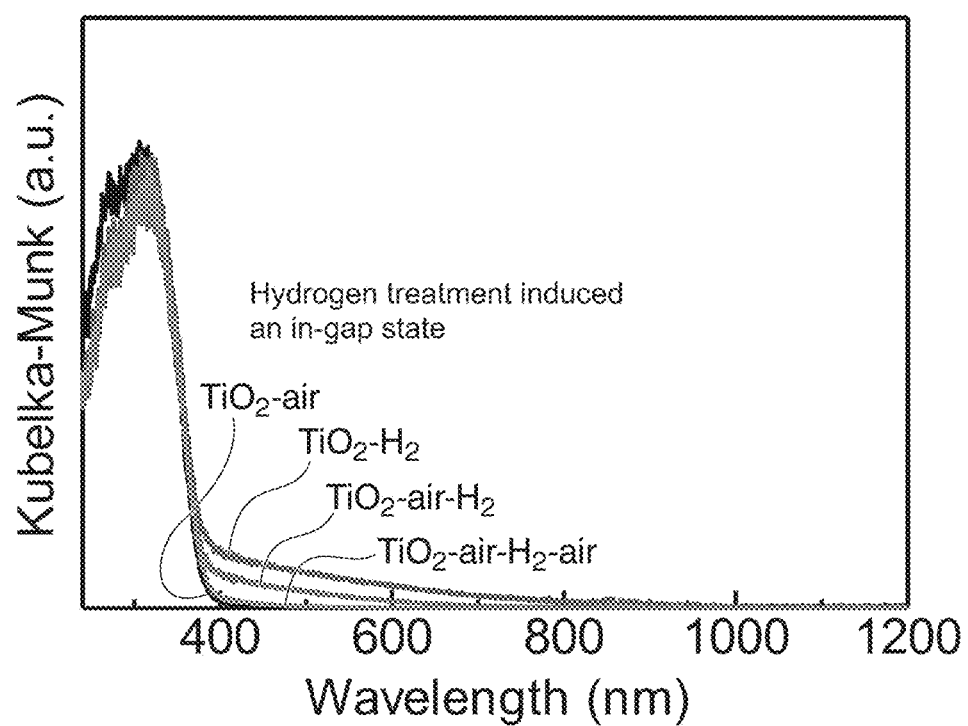
FIG. 10 is ultraviolet-visible visible spectra of a catalyst obtained by a hydrogen treatment on $TiO_2$-air and sample catalysts obtained by oxidizing the catalyst again.

In order to understand the origin of a change in the optical characteristics in TiO$_2$—H$_2$, the ultraviolet-visible absorption spectra of a sample obtained by carrying out a hydrogen treatment on TiO$_2$-air and a sample obtained by oxidizing the above-described sample again were measured (FIG. 10).

The horizontal axis of FIG. 10 is the wavelength (nm), and the vertical axis is the intensity (a.u.) that corresponds to the light absorption coefficient and is obtained by the Kubelka-Munk conversion of the reflectance R. $TiO_2$-air-$H_2$ in FIG. 10 indicates a catalyst obtained by heating $TiO_2$-air at 450° C. for 30 minutes under a hydrogen atmosphere, and $TiO_2$-air-$H_2$-air indicates a catalyst obtained by heating $TiO_2$-air-$H_2$ again at 450° C. for 30 minutes under the atmosphere.

$TiO_2$-air-H obtained by carrying out a hydrogen treatment on white $TiO_2$-air also, similar to $TiO_2$—H, exhibited dark brown and showed absorption from the visible light region to the near-infrared region. Furthermore, a sample $TiO_2$-air-H-air obtained by heating this $TiO_2$-air-H again in the air was white, showed the same spectrum as that of $TiO_2$-air, but did not show any absorption from the visible light region to the near-infrared region. Therefore, it was implied that the peculiar absorption observed in the absorption spectrum of $TiO_2$—H or $1Cu$—$TiO_2$—H was developed due to the fact that hydrogen was incorporated into lattices in the vicinity of the $TiO_2$ surface.

(C1s XPS Spectra of Catalysts)

Figure 11:
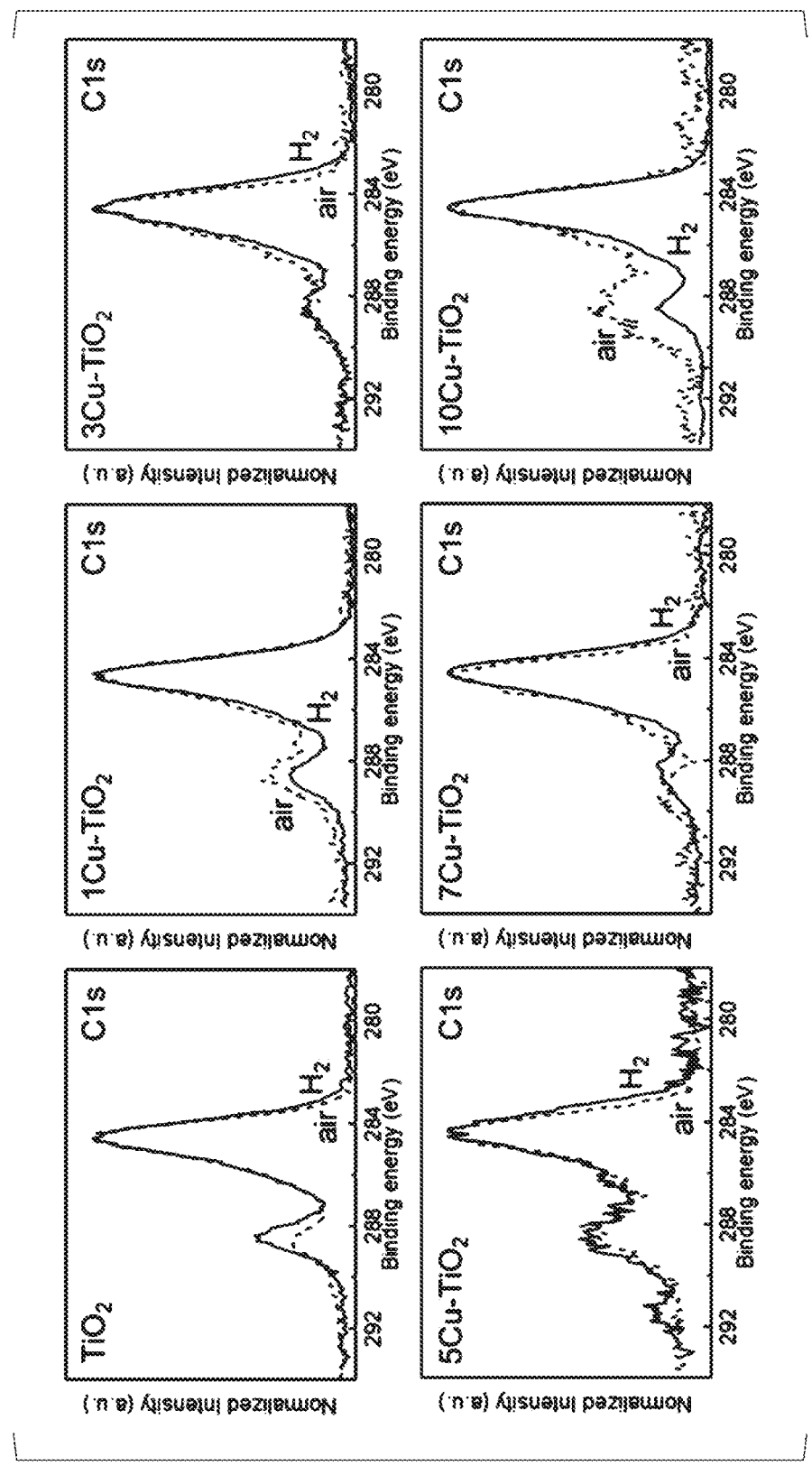
FIG. 11 is XPS spectra of C1S of catalysts obtained by a heating treatment under the atmosphere or under a hydrogen atmosphere with a different Cu content.

$TiO_2$ into which C had been doped also shows absorption from the visible light region to the near-infrared region. The results of the C1s XPS measurement of xCu—$TiO_2$-air's and xCu—$TiO_2$—H's for the purpose of detecting carbon derived from an organic titanium raw material, which was possibly doped into the $TiO_2$ lattices, are shown in FIG. 11. The doped carbon shows peaks belonging to a carbon ion at approximately 281.8 eV, which is different from a peak at a binding energy of 284.6 eV (C—C) of the main peak of C1s derived from an impurity. As shown in FIG. 11, in xCu—$TiO_2$-air's and xCu—$TiO_2$—H's, there were no carbon ion peaks (281.8 eV), and no noticeable difference were shown between the catalysts. Therefore, it was confirmed that the absorption in the visible light region observed in the ultraviolet-visible light absorption spectra of xCu—$TiO_2$—H's was not derived from the doped carbon.

Figure 12:
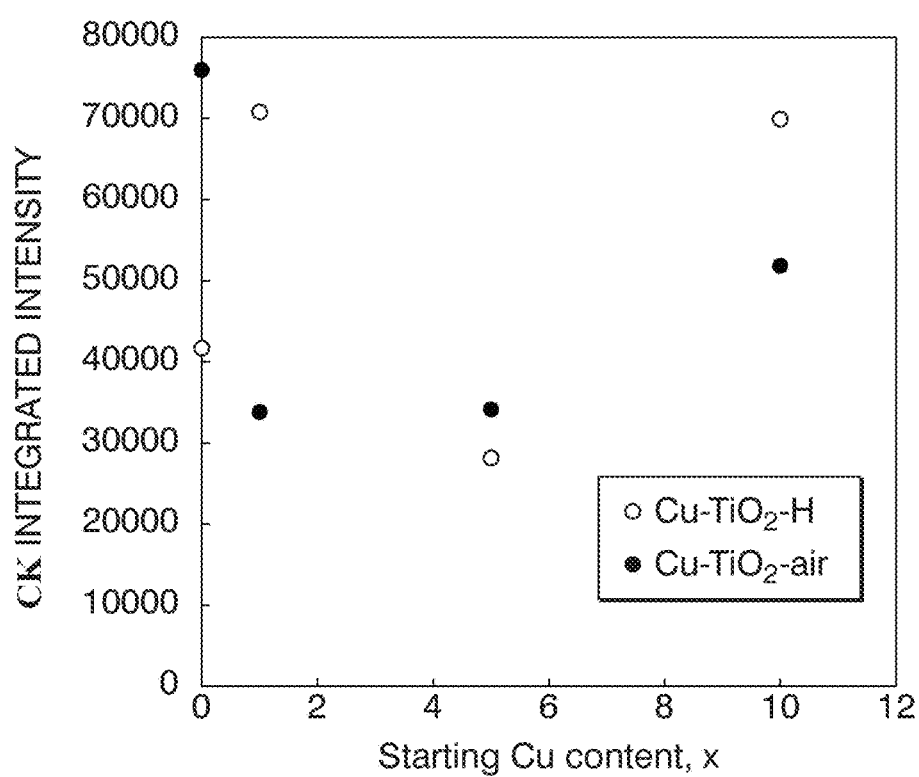
FIG. 12 is a view showing the relationship between the Cu starting composition of a catalyst and the intensity of a CK ray measured by EDS.

Additionally, since there were no noticeable differences observed in the intensities of CK rays that were detected in xCu—$TiO_2$-air's and xCu—$TiO_2$—H's by SEM-EDS analysis (FIG. 12), it was confirmed that the absorption in the visible light region observed in the ultraviolet-visible light absorption spectra of xCu—$TiO_2$—H's was not derived from the impurity carbon. In $3Cu$—$TiO_2$—H containing 3 wt % or more of Cu obtained by the heating treatment under hydrogen atmosphere, an absorption band derived from the surface plasmon (SPR) of Cu appeared at 575 nm to 580 nm. As implied from the results of XRD and XPS, it was found that Cu nanoparticles were formed on these catalysts.

(Electronic Microscope Images)

Figure 13:
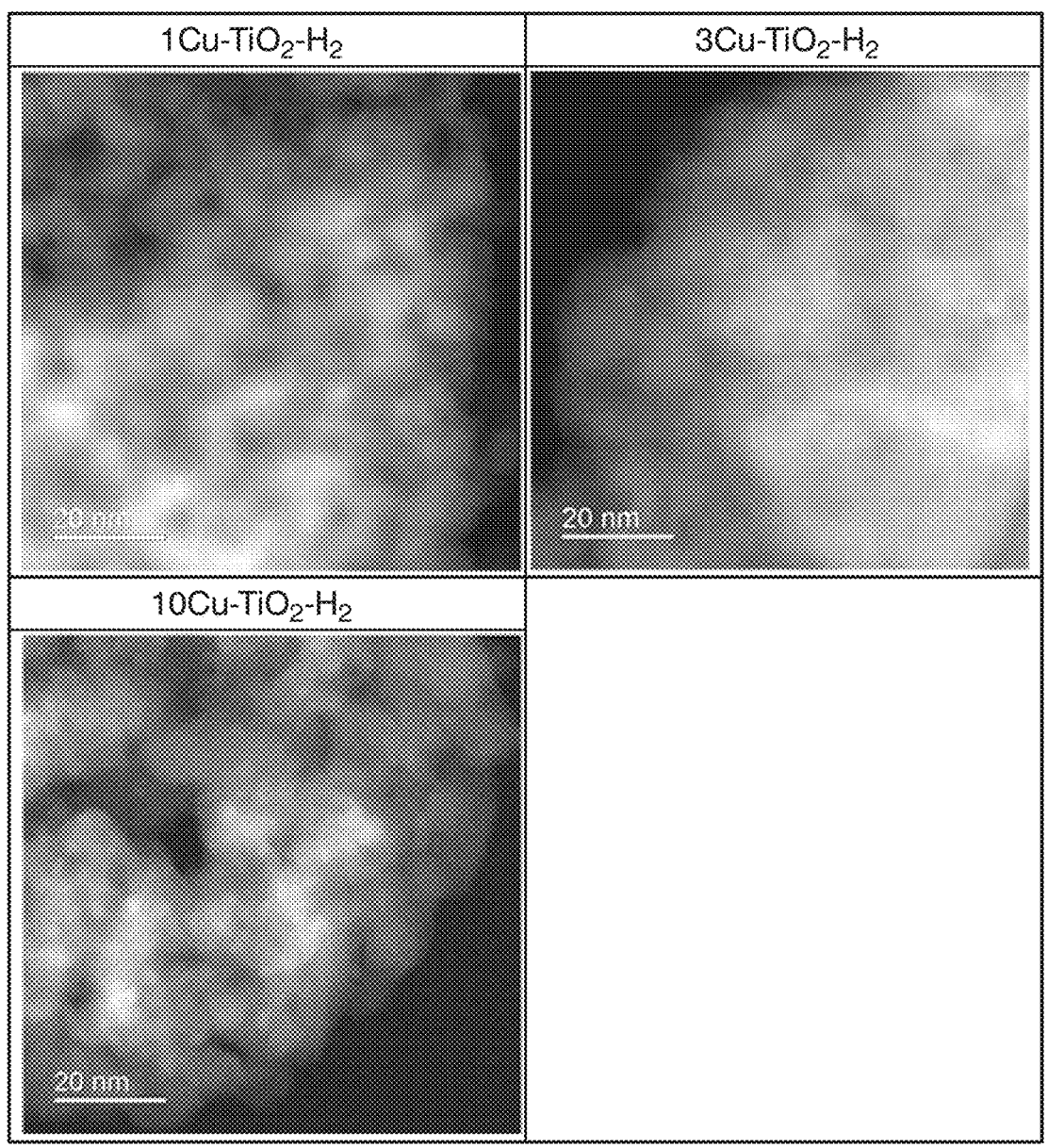
FIG. 13 is high-angle dark field scanning transmission electron microscope images of catalysts obtained by a heating treatment under a hydrogen atmosphere with a different Cu content.

FIG. 13 shows the high-angle dark field scanning transmission electron microscope obtained by the heating treatment under the hydrogen atmosphere with a different Cu content. From the high angle dark field scanning transmission electron microscope (HAADF-STEM) images, it was confirmed that Cu species are supported in a highly dispersed state.

(Catalyst Activity)

Figure 14:
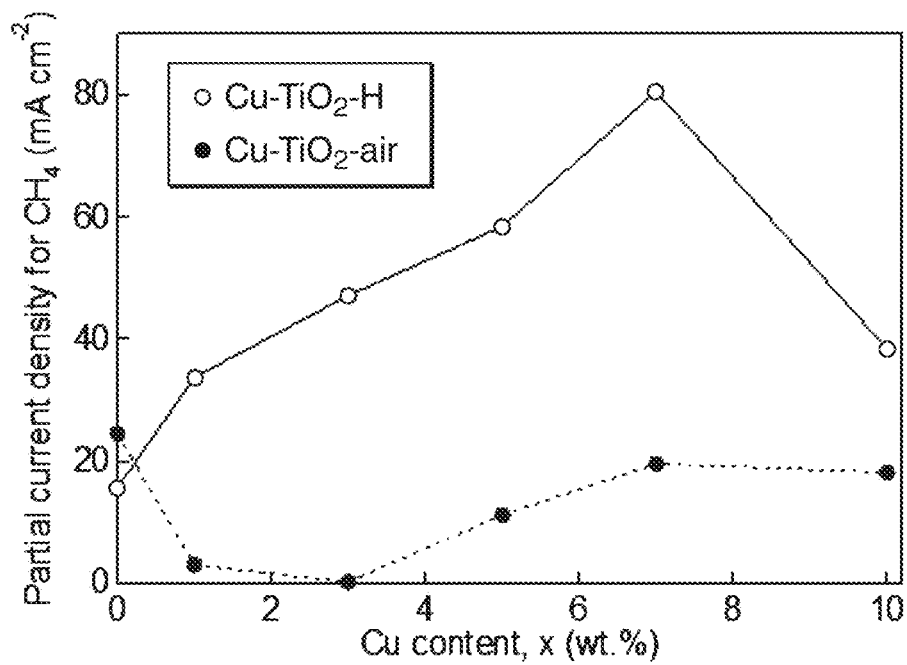
FIG. 14 is a view showing the relationship between the Cu content and the partial current density of methane production.

FIG. 14 shows the relationship between the Cu content and the partial current density of methane production. The horizontal axis of FIG. 14 indicates the Cu content (wt %), and the vertical axis indicates the partial current density (mA $cm^{-2}$) with respect to methane production. $CH_4$ was produced even without Cu, but the partial current density with respect to $CH_4$ production significantly improved due to the support of Cu. Particularly, in the hydrogen-treated xCu—$TiO_2$—H's, the current densities significantly improved as compared with those in xCu—$TiO_2$-air's. It is considered that the activities of the catalysts increased due to the Cu content and the heating treatment under the hydrogen atmosphere.

Figure 15:
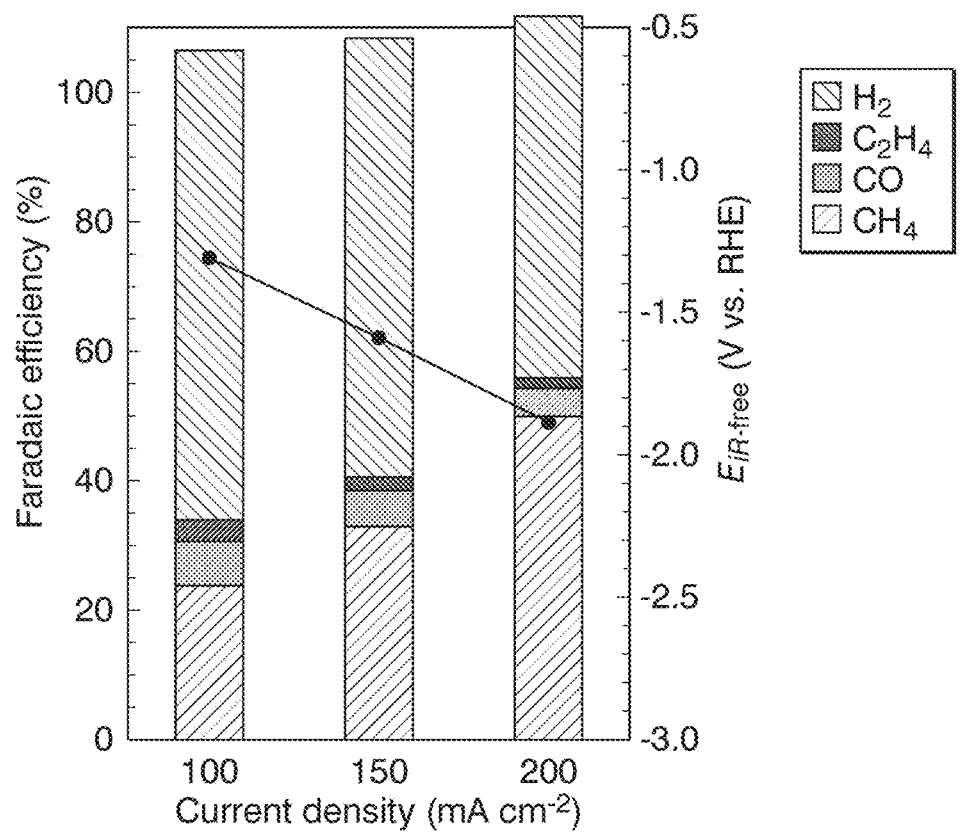
FIG. 15 is a view showing the relationship between a product and a current density in the case of using 5Cu—$TiO_2$—H and a 50 wt % Nation (registered trademark) catalyst.

The relationship between a product distribution at the time of carrying out $ECO_2R$ using the $5Cu$—$TiO_2$—H catalyst and the current density is shown in FIG. 15. The horizontal axis of FIG. 15 indicates the current density (mA $cm^{-2}$), the first vertical axis indicates the Faradaic efficiency (%), and the second vertical axis indicates the IR-free voltage (V vs. RHE).

As shown in FIG. 15, in the case of using the $5Cu$—$TiO_2$—H catalyst, the selectivity for $CH_4$ in the $CO_2$ reduction product was 90%. From the above-described fact, it was found that the catalyst of the present disclosure is capable of selectively reducing $CO_2$ to $CH_4$. The Faradaic efficiency to $CH_4$ was 50%, and the partial current density with respect to $CH_4$ production was 100 mA $cm^{-2}$.

INDUSTRIAL APPLICABILITY

The electrochemical reduction method, the catalyst, and the method for producing a catalyst of the present disclosure are capable of improving the selectivity for $CH_4$ production in the electrochemical reduction reaction of $CO_2$ and is thus highly industrially applicable.

REFERENCE SIGNS LIST

10 Anode
15 Separator
20 Cathode
30 First channel plate
31 Second channel plate
32 Third channel plate
33 Fourth channel plate
40 Gas discharge member
45 Lid member
50 First channel structure
60 Second channel structure
70 Third channel structure
100 Electrochemical reduction device
140 Power supply
151 First solution delivery portion
152 Wastewater collection portion
161 Second solution delivery portion
162 Liquid product collection portion
171 Gas delivery portion
172 Gas product collection portion

What is claimed is:
1. A catalyst comprising:
an oxide containing Ti; and
Cu,
wherein, in an ultraviolet-visible absorption spectrum of the catalyst, a ratio $I_{400}/I_{600}$ of an intensity $I_{400}$ at a wavelength of 400 nm to an intensity $I_{600}$ at a wavelength of 600 nm is 0.5 to 3.
2. A catalyst comprising:
an oxide containing Ti; and
Cu,
wherein, in an X-ray photoelectron spectroscopy (XPS) spectrum measured by XPS, there is a peak between 528 eV and 532 eV, and a half-width value of the peak that is present between is 1.2 eV to 1.55 eV.

3. A catalyst comprising:
an oxide containing Ti; and
Cu,
wherein, in an X-ray photoelectron spectroscopy (XPS) spectrum of the catalyst measured by XPS, there is a peak between 457 eV and 460 eV, and a half-width value of the peak that is present between 457 eV and 460 eV is 1.1 eV to 1.5 eV.

4. A catalyst comprising:
an oxide containing Ti; and
Cu,
wherein, in an X-ray photoelectron spectroscopy (XPS) spectrum measured by XPS, there is a peak between 931 eV and 933 eV, and a half-width value of the peak that is present between 931 eV and 933 eV is 1.4 eV to 1.9 eV.

* * * * *